United States Patent Office 3,242,173
Patented Mar. 22, 1966

3,242,173
BASIC TRI-SUBSTITUTED PYRIMIDO-
[4,5-d]-PYRIMIDINES
Gerhard Ohnacker and Eberhard Woitun, Biberach an der Riss, Germany, assignors, by mesne assignments, to Boehringer Ingelheim G.m.b.H., Ingelheim (Rhine), Germany, a corporation of Germany
No Drawing. Filed Jan. 11, 1963, Ser. No. 250,744
11 Claims. (Cl. 260—246)

This is a continuation-in-part of copending application Serial No. 88,003, filed February 9, 1961, now abandoned.

This invention relates to a novel class of basic tri-substituted pyrimido-[4,5-d]-pyrimidines and their non-toxic acid addition salts, as well as to various methods of preparing such compounds.

More specifically, the present invention relates to pyrimido-[4,5-d]-pyrimidine substitution products of the formula

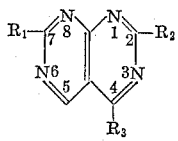

wherein
$R_1$ and $R_2$ are basic heterocycles, each selected from the group consisting of pyrrolidino, piperidino, morpholino, lower alkyl-morpholino and N'-lower alkyl-piperazino, and
$R_3$ is selected from the group consisting of pyrrolidino, piperidino, morpholino, lower alkyl-morpholino, N'-lower alkyl-piperazino, mono-lower alkyl-amino, di-lower alkyl-amino, mono-lower alkenyl-amino, di-lower alkenyl-amino, cycloalkyl-amino, aralkyl-amino, lower akyl-aralkyl-amino, lower alkoxy-lower alkyl-amino, (amino-lower alkyl)-amino, hydrazino, lower alkoxy, lower alkenyloxy, cyclohexyloxy, lower alkoxy-lower alkoxy and (lower alkyl-amino)-lower alkoxy,
and their non-toxic, pharmacologically acceptable acid addition salts.

The novel class of compounds represented by Formula I above may be prepared by reacting a compound of the formula

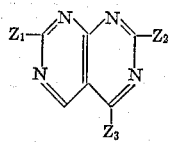

wherein one, two or all three of substituents $Z_1$, $Z_2$ and $Z_3$ are halogen, quaternary ammonium, mercapto or alkyl-mercapto and, if only one or two of these substituents have the above meanings, the remainder are substituents of the group defined by $R_1$ and $R_2$ in connection with Formula I, and $Z_3$ may, in addition, be hydroxyl, lower alkoxy, lower alkenyloxy, cyclohexyloxy, lower alkoxy-lower alkoxy or (lower alkyl-amino)-lower alkoxy, with from 1 to 3 mol equivalents or more of an amine selected from the group consisting of pyrrolidine, piperidine, morpholine, lower alkyl-morpholine, N-lower alkyl-piperazines, mono-lower alkyl-amines, di-lower alkyl-amines, mono-lower alkenyl-amines, di-lower alkenyl-amines, cycloalkyl-amines, aralkyl-amines, lower alkyl-aralkyl-amines, lower alkoxy-lower alkyl-amines, (amino-lower alkyl)-amines and hydrazine.

If $Z_3$ is halogen and if it is desired to prepare compounds of the Formula I wherein $R_3$ is a substituent other than a basic radical, the reaction is carried out with 1 mol or a slight excess of a lower alkanol, lower alkoxy-alkanol, (lower alkyl-amino)-alkanol, lower alkenol, or cyclohexanol, preferably in the absence of an alkaline substance capable of tying up or neutralizing the hydrogen halide formed by the reaction, such as in the presence of an alkali metal alcoholate.

If $Z_3$ is hydroxyl and if it is desired to prepare compounds of the Formula I wherein $R_3$ is a substituent other than a basic radical, the reaction product can be alkylated by known methods.

In the event that two or all three of substituents $Z_1$, $Z_2$ and $Z_3$ in compound II are halogen, quaternary ammonium, mercapto or alkyl-mercapto, the reaction is carried out in a single step with 2 or 3 mol equivalents or an excess of one of the amines listed above, whereby a compound of the Formula I is formed wherein two or all three of substituents $R_1$, $R_2$ and $R_3$ are identical basic radicals. However, compounds of the Formula I wherein two or all three of substituents $R_1$, $R_2$ and $R_3$ are different basic radicals may be obtained, if initially only one of substituents $Z_1$, $Z_2$ or $Z_3$ is exchanged for a basic radical, i.e., if compound II wherein two or all three of substituents $Z_1$, $Z_2$ and $Z_3$ are halogen, quaternary ammonium, mercapto or alkyl-mercapto is first reacted with 1 mol equivalent of the desired amine, and the product thus obtained, which still contains one or two non-basic substituents exchangeable for a basic radical, is then reacted with 1 or 2 mol equivalents of one or two different amines.

Compounds of the Formula I wherein $R_3$ is lower alkoxy, lower alkoxy-lower alkoxy, lower alkenyloxy, cyclohexyloxy or (lower alkyl-amino)-lower alkoxy are most convenienty prepared by starting with compounds of the Formula II wherein $Z_3$ is already one of these substituents. However, they may also be prepared by starting with compounds II wherein $Z_3$ is halogen or hydroxyl and first introducing the two basic substituents $R_1$ and $R_2$ by the method described above and then either transforming the halogen into lower alkoxy by customary methods, such as by reaction with an alkali metal alkanolate, or transforming the hydroxyl group into an alkoxy group by known methods, such as by reaction with a corresponding alkyl halide in the presence of a substance capable of tying up or neutralizing the hydrogen halide formed by the reaction.

The substitution reactions described above may be carried out within a wide temperature range, preferably at temperatures between 20 and 200° C. The reaction components are used in stoichiometric quantitative ratios, but it is also possible to use an excess of the amine or of the alkali metal alcoholate. The reactions are preferably carried out in the presence of an inert solvent and, if necessary, in the presence of a reaction accelerator and, if desired, under pressure. In the event that halogen atoms are to be exchanged for basic radicals, it is necessary to use an agent capable of tying up or neutralizing the hydrogen halide liberated by the reaction. Inorganic or tertiary organic bases may be used for this purpose.

Examples of suitable inert solvents are water, alcohols, dioxane, acetone, aromatic hydrocarbons and dimethylformamide. Examples of suitable reaction accelerators are copper, copper salts, alkali metal iodides, or the acid addition salts of the amines. If it is desired to exchange all of the exchangeable substituents in compounds of Formula II for the same basic radicals, the reaction is preferably carried out with a large excess of the particular amine, which then simultaneously serves as the solvent and as the agent capable of tying up or neutralizing the acid liberated by the reaction.

The subsequent alkylation of pyrimido-[4,5-d]-pyrimidines which contain a free hydroxyl group in the 4-position is preferably effected in an aqueous medium and at moderately elevated temperatures in the presence of an acid-binding agent; inorganic bases, such as sodium hydroxide or potassium carbonate, are particularly useful for this purpose.

The pyrimido-[4,5-d]-pyrimidines of the Formula II, used as starting materials, are either known compounds or they may be prepared by known methods by condensation of corresponding substituted pyrimides with esters or amines of formic acid, carbonic acid or thiocarbonic acid. For example, halogen-substituted pyrimido-[4,5-d]-pyrimidines are obtained by halogenation of the nucleus or by exchange of hydroxyl groups for halogen atoms in accordance with known methods.

The following examples will illustrate the preparation of a number of representative members of the group of compounds embraced by Formula I. It will be understood, however, that the present invention is not limited to these particular representative members.

EXAMPLE I

*Various 2,7-diamino-4-hydroxy-pyrimido-[4,5-d]-pyrimidines, used as starting materials for the preparation of compounds of Formula I*

(a) *2,7-dimorpholino - 4 - hydroxy-pyrimido-[4,5-d]-pyrimidine.*—1.2 gm. (0.005 mol) of 2,7-bis-(ethylmercapto)-4-hydroxy-pyrimido-[4,5-d]-pyrimidine were dissolved in 4 cc. (0.05 mol) morpholine and the resulting solution was heated on an oil bath for two hours at 130° C. (oil bath temperature). The reaction product precipitated out. The crystalline precipitate was separated by vacuum filtration, washed with ethanol and was then reprecipitated from 1 N NaOH with 1 N HCl. Yield: 1.3 gm. (88% of theory). Recrystallized from dimethylformamide, the product had a melting point higher than 340° C.

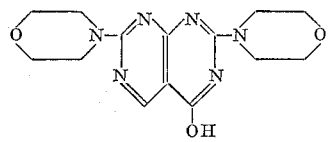

Analysis ($C_{14}H_{18}O_3N_6$): Molecular weight 318.34. Calculated: C, 52.82%; H, 5.70%; N, 26.40%. Found: C, 53.03%; H, 5.96%; N, 26.00%.

(b) *2,7 - dipiperidino - 4 - hydroxy-pyrimido-[4,5-d]-pyrimidine.*—8.0 gm. (0.03 mol) of 2,7-bis-(ethylmercapto)-4-hydroxy-pyrimido-[4,5-d]-pyrimidine were dissolved in 65 cc. (0.7 mol) of piperidine and the resulting solution was refluxed for twenty-four hours. A portion of the reaction product precipitated during this period. After termination of the reaction, the reaction mixture was filtered, the filtrate was poured into water and the aqueous mixture was acidified with dilute acetic acid, whereby the principal amount of the reaction product separated out. The reaction product was separated and recrystallized from butanol, whereupon it had a melting point of 299 to 301° C. Yield: 7.6 gm. (81% of theory).

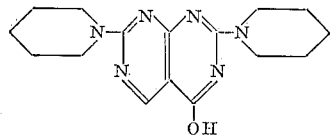

Analysis ($C_{16}H_{22}ON_6$): Molecular weight 314.38. Calculated: C, 61.12%; H, 7.05%; N, 26.73%. Found: C, 61.15%; H, 7.37%; N, 26.35%.

(c) *2,7 - dipyrrolidino - 4 - hydroxy-pyrimido-[4,5-d]-pyrimidine.*—5.4 gm. (0.02 mol) of 2,7-bis-(ethylmercapto)-4-hydroxy-pyrimido-[4,5-d]-pyrimidine were dissolved in 50 cc. (0.6 mol) of pyrrolidine, and the resulting solution was refluxed for twenty-four hours. The crystalline reaction product precipitated during this time. It was separated and recrystallized from ethanol, whereupon it had a melting point higher than 330° C. Yield: 4.8 gm. (84% of theory).

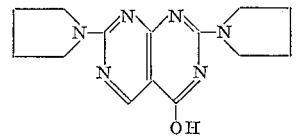

Analysis ($C_{14}H_{18}ON_6$): Molecular weight 286.34. Calculated. C, 58.73%; H, 6.34%; N, 29.35%. Found: C, 59.30%; H, 6.48%; N, 29.30%.

(d) *2,7 - di-(N'-methyl-piperazino)-4-hydroxy-pyrimido-[4,5-d]-pyrimidine.*—5.4 gm. (0.02 mol) of 2,7-bis-(ethylmercapto) - 4 - hydroxy-pyrimido-[4,5-d]-pyrimidine were heated with 30 cc. (0.25 mol) of N-methyl-piperazine on an oil bath for three hours at 160° C. (oil bath temperature), whereby the solids went rapidly into solution. Upon cooling, the reaction product crystallized out. The reaction product was separated and was recrystallized twice from ethanol (95%) in the presence of animal charcoal, whereupon it had a melting point of 275 to 278° C. (decomposition). Yield: 2.4 gm. (35% of theory).

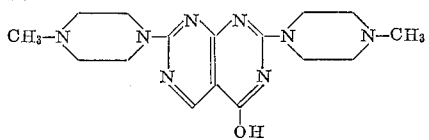

Using procedures analogous to those described under (a)–(d), the following 2,7-diamino-4-hydroxy-pyrimido-[4,5-d]-pyrimidines were prepared:

(e) *2,7-bis-(diethylamino) - 4 - hydroxy-pyrimido-[4,5-d] - pyrimidine* from 2,7 - bis-(ethylmercapto)-4-hydroxy-pyrimido-[4,5-d]-pyrimidine and diethylamine. The reaction product had a melting point of 252–254° C.

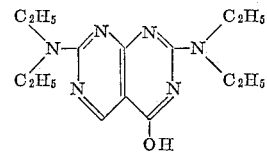

Analysis ($C_{14}H_{22}N_6O$): Molecular weight 290.37. Calculated: C, 57.91%; H, 7.64%; N, 28.95%. Found: C, 58.20%; H, 7.94%; N, 29.35%.

(f) *2,7 - bis-(dibutylamino) - 4 - hydroxy-pyrimido-[4,5-d]-pyrimidine* from 2,7-bis-(ethylmercapto) - 4 - hydroxy-pyrimido - [4,5-d] - pyrimidine and dibutylamine. The reaction product had a melting point higher than 350° C.

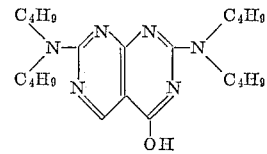

Analysis ($C_{22}H_{38}N_6O$): Molecular weight 402.59. Calculated: C, 65.64%; H, 9.51%; N, 20.88%. Found: C, 65.70%; H, 9.52%; N, 20.90%.

(g) *2-piperidino - 7 - morpholino-4-hydroxy-pyrimido-[4,5-d] - pyrimidine* from 2-mercapto-4-hydroxy-7-morpholino-pyrimido-[4,5-d]-pyrimidine and piperidine. The reaction product had a melting point of 345–350° C. (decomposition).

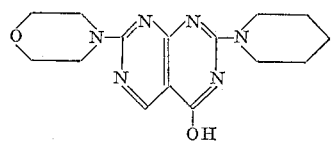

Analysis (C₁₅H₂₀N₆O₂): Molecular weight 316.38. Calculated: C, 56.95%; H, 6.37%; N, 26.57%. Found: C, 57.00%; H, 6.71%; N, 26.20%.

(h) *2,7 - bis-(2-methyl-morpholino)-4-hydroxy-pyrimido-[4,5-d]-pyrimidine* from 2,7-bis-(ethylmercapto)-4-hydroxy-pyrimido-[4,5-d]-pyrimidine and 2-methyl-morpholine. The reaction product had a melting point of about 335° C.

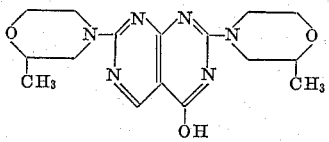

Analysis (C₁₆H₂₂N₆O₃): Molecular weight 346.40. Calculated: C, 55.48%; H, 6.40%; N, 24.26%. Found: C, 55.20%; H, 6.25%; N, 24.45.

EXAMPLE II

*Various 2,4,7-triamino-pyrimido-[4,5-d]-pyrimidines*

(a) *2,4,7 - trimorpholino-pyrimido - [4,5-d]-pyrimidine.*—1 gm. (0.003 mol) of 2,7-dimorpholino-4-chloro-pyrimido-[4,5-d]-pyrimidine (obtained by chlorination of the compound obtained in Example I a) was refluxed with 20 cc. (0.23 mol) of morpholine for one hour. The starting material rapidly went into solution, and a little later the reaction product precipitated out. It was separated by filtration and recrystallized from ethanol in the presence of animal charcoal, whereupon it had a melting point of 213 to 214° C. Yield: 0.8 gm. (69% of theory).

Analysis (C₁₈H₂₅O₃N₇): Molecular weight 387.34. Calculated: C, 55.80%; H, 6.50%; N, 25.31%. Found: C, 56.20%; H, 6.82%; N, 25.20%.

Using a procedure analogous to that described in (a) above, but shortening or prolonging the reaction time and varying the reaction temperature, as required, the following 2,4,7-triamino-pyrimido-[4,5-d] - pyrimidines were also prepared:

(b) *2,7-dimorpholino-4 - piperidino-pyrimido-[4,5-d]-pyrimidine* from 2,7-dimorpholino-4 - chloro-pyrimido-[4,5-d]pyrimidine and piperidine. The reaction product had a melting point of 188–189° C.

Analysis (C₁₉H₂₇O₂N₇): Molecular weight 385.47. Calculated: C, 59.20%; H, 7.06%; N, 25.44%. Found: C, 59.30%; H, 7.54%; N, 25.70%.

(c) *2,7-dimorpholino-4 - pyrrolidino-pyrimido-[4,5-d]-pyrimidine* from 2,7-dimorpholino-4 - chloro-pyrimido-[4,5-d]-pyrimidine and pyrrolidine. The product had a melting point of 278° C.

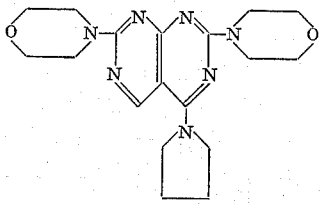

Analysis (C₁₈H₂₅O₂N₇): Molecular weight 371.45. Calculated: C, 58.20%; H, 6.78%; N, 26.40%. Found: C, 57.75%, H, 6.97%; N, 26.40%.

(d) *2,7-dimorpholino-4 - diethylamino-pyrimido-[4,5-d]-pyrimidine* from 2,7-dimorpholino-4-chloro-pyrimido-[4,5-d]-pyrimidine and diethylamine. The product had a melting point of 187–188° C.

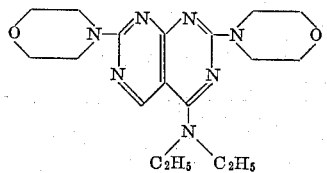

Analysis (C₁₈H₂₇O₂N₇): Molecular weight 373.47. Calculated: C, 57.89%; H, 7.29%; N, 26.26%. Found: C, 57.95%; H, 7.78%; N, 26.30%.

(e) *2,7-dimorpholino - 4-n-butylamino-pyrimido-[4,5-d]-pyrimidine* from 2,7-dimorpholino-4-chloro-pyrimido-[4,5-d]-pyrimidine and n-butylamine. The product had a melting point of 303–304° C.

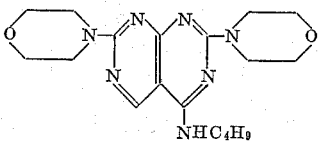

Analysis (C₁₈H₂₇O₂N₇): Molecular weight 373.47. Calculated: C, 57.89%; H, 7.29%; N, 26.26%. Found: C, 57.80%; H, 7.47%; N, 26.15%.

(f) *2,7-dimorpholino - 4 - propylamino - pyrimido-[4,5-d]-pyrimidine* from 2,7 - dimorpholino - 4 - chloro-pyrimido-[4,5-d]-pyrimidine and n-propylamine. The product had a melting point of 320–322° C.

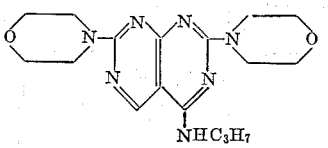

Analysis (C₁₇H₂₅N₇O₂): Molecular weight 359.45. Calculated: C, 56.81%; H, 7.01%; N, 27.28%. Found: C, 56.70%; H, 7.52%; N, 27.10.

(g) *2,7 - dimorpholino - 4 - benzylamino - pyrimido-[4,5-d] - pyrimidine* from 2,7 - dimorpholino - 4 - chloro-pyrimido-[4,5-d]-pyrimidine and benzylamine. The product had a melting point of 265–266° C.

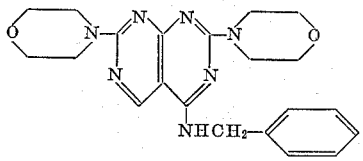

Analysis (C₂₁H₂₅N₇O₂): Molecular weight 407.49. Calculated: C, 61.90%; H, 6.18%; N, 24.06%. Found: C, 61.95%; H, 6.49%; N, 23.70%.

(h) *2,7-dimorpholino - 4 - hydrazino - pyrimido-[4,5-d]-pyrimidine* from 2,7 - dimorpholino - 4 - chloropyrimido - [4,5 - d] - pyrimidine and hydrazine. The product had a melting point of 295–297° C.

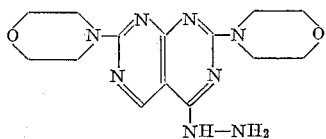

Analysis (C₁₄H₂₀N₈O₂): Molecular weight 332.37. Calculated: C, 50.59%; H, 6.07%; N, 33.72%. Found: C, 50.50%; H, 6.34%; N, 33.85.

(i) 2,7 - dimorpholino - 4 - cyclohexylamino - pyrimido - [4,5 - d] - pyrimidine from 2,7 - dimorpholino-4 - chloro - pyrimido - [4,5 - d] - pyrimidine and cyclohexylamine. The product had a melting point of 345–348° C.

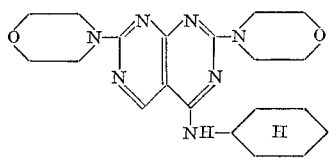

Analysis (C₂₀H₂₉N₇O₂): Molecular weight 399.51. Calculated: C, 60.13%; H, 7.32%; N, 24.54%. Found: C, 59.80%; H, 7.60%; N, 24.45%.

(j) 2,7 - dimorpholino - 4 - (2 - methylmorpholino)- pyrimido - [4,5 - d] - pyrimidine from 2,7-dimorpholino - 4 - chloro - pyrimido - [4,5 - d] - pyrimidine and 2-methyl-morpholine. The product had a melting point of 218° C.

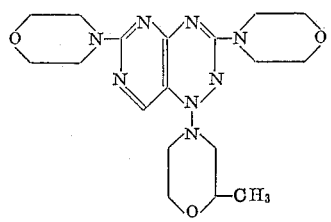

Analysis (C₁₉H₂₇N₇O₃): Molecular weight 401.48. Calculated: C, 56.84%; H, 6.78%; N, 24.12%. Found: C, 57.15%; H, 7.43%; N, 24.90%.

(k) 2,7 - dimorpholino - 4 - isoamylamino - pyrimido- [4,5 - d] - pyrimidine from 2,7 - dimorpholino - 4-chloro-pyrimido - [4,5 - d] - pyrimidine and isoamylamine. The product had a melting point of 303–304° C.

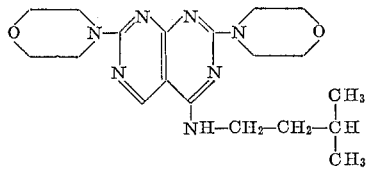

Analysis (C₁₉H₂₉N₇O₂): Molecular weight 387.50. Calculated: C, 58.89%; H, 7.54%; N, 25.30%. Found: C, 59.45%; H, 8.09%; N, 25.40%.

(l) 2,7 - dimorpholino - 4 - isopropylamino - pyrimido- [4,5 - d] - pyrimidine from 2,7-dimorpholino-4-chloro-pyrimido - [4,5 - d] - pyrimidine and isopropylamine. The product had a melting point of 334–335° C.

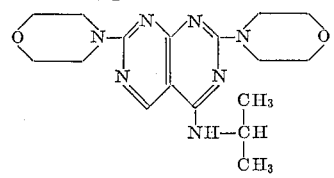

Analysis (C₁₇H₂₅N₇O₂): Molecular weight 359.45. Calculated: C, 56.81%; H, 7.01%; N, 27.28%. Found: C, 57.20%; H, 7.57%; N, 27.05%.

(m) 2,7 - dimorpholino - 4 - (N' - methyl - piperazino)- pyrimido - [4,5 - d]-pyrimidine from 2,7-dimorpholino-4-chloro-pyrimido-[4,5-d]-pyrimidine and N-methyl-piperazine. The product had a melting point of 288° C. (decomposition).

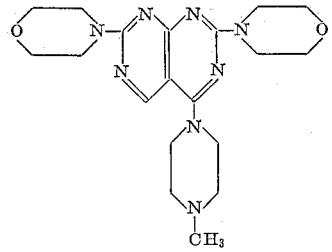

Analysis (C₁₉H₂₈N₈O₂): Molecular weight 400.50. Calculated: C, 56.98%; H, 7.05%; N, 27.98%. Found: C, 56.80%; H, 7.38%; N, 27.40%.

(n) 2,7 - dimorpholino - 4 - (3-methoxy-propylamino)- pyrimido - [4,5 - d]-pyrimidine from 2,7-dimorpholino-4-chloro-pyrimido-[4,5-d]-pyrimidine and 3-methoxy-propylamine. The product had a melting point of 265–266° C.

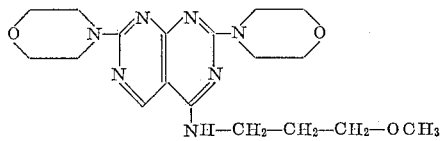

Analysis (C₁₈H₂₇N₇O₃): Molecular weight 389.47. Calculated: N, 25.18%. Found: N, 25.20%.

(o) 2,7 - dimorpholino - 4 - (n - heptylamino) - pyrimido - [4,5 - d] - pyrimidine from 2,7 - dimorpholino-4-chloro - pyrimido-[4,5-d]-pyrimidine and n-heptylamine. The product had a melting point of 212° C.

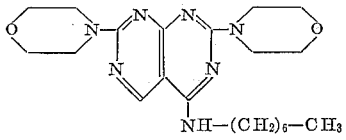

Analysis (C₂₁H₃₃N₇O₂): Molecular weight 415.55. Calculated: C, 60.70%; H, 8.00%; N, 23.60%. Found: C, 60.65%; H, 8.40%; N, 23.40%.

(p) 2,7 - dimorpholino - 4 - (n - octylamino)-pyrimido- [4,5-d]-pyrimidine from 2,7-dimorpholino-4-chloro-pyrimido-[4,5-d]-pyrimidine and n-octylamine. The product had a melting point of 222° C.

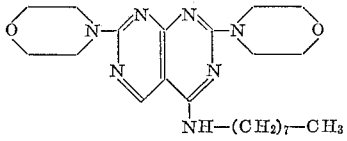

Analysis (C₂₂H₃₅N₇O₂): Molecular weight 429.58. Calculated: C, 61.51%; H, 8.21%; N, 22.83%. Found: C, 61.70%; H, 8.59%; N, 23.00%.

(q) 2,7 - dimorpholino - 4 - (n - decylamino)-pyrimido- [4,5-d]-pyrimidine from 2,7 - dimorpholino-pyrimido-[4,5-d]-pyrimidine and n-decylamine. The product had a melting point of 228° C.

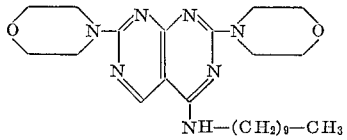

Analysis (C₂₄H₃₉N₇O₂): Molecular weight 457.63. Calculated: C, 62.99%; H, 8.59%; N, 21.43%. Found: C, 63.10%; H, 8.78%; N, 21.60%.

(r) 2,7 - dimorpholino - 4 - (n-amylamino) - pyrimido- [4,5-d]-pyrimidine from 2,7-dimorpholino-4-chloro-pyrimido-[4,5-d]-pyrimidine and n-amylamine. The product had a melting point of 272° C.

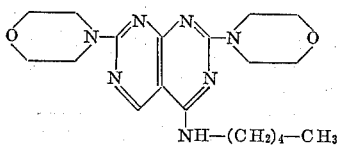
NH—(CH₂)₄—CH₃

Analysis (C₁₉H₂₉N₇O₂): Molecular weight 387.50. Calculated: C, 58.89%; H, 7.54%; N, 25.30%. Found: C, 59.30%; H, 7.80%; N, 25.30%.

(s) *2,7 - dimorpholino - 4 - (n-hexylamino) - pyrimido-[4,5-d]-pyrimidine* from 2,7 - dimorpholino-4-chloro-pyrimido-[4,5-d]-pyrimidine and n-hexylamine. The product had a melting point of 246° C.

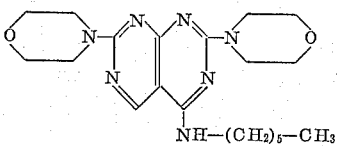
NH—(CH₂)₅—CH₃

Analysis (C₂₉H₃₁N₇O₂): Molecular weight 401.53. Calculated: C, 59.83%; H, 7.78%; N, 24.42%. Found: C, 60.25%; H, 7.98%; N, 24.30%.

(t) *2,7-dimorpholino - 4 - benzylethylamino-pyrimido-[4,5-d]-pyrimidine* from 2,7-dimorpholino-4-chloro-pyrimido-[4,5-d]-pyrimidine and benzylethylamine. The product had a melting point of 157° C.

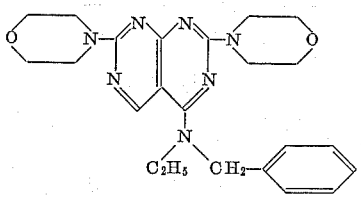

Analysis (C₂₃H₂₉N₇O₂): Molecular weight 435.54. Calculated: C, 63.43%; H, 6.56%; N, 22.51%. Found: C, 63.10%; H, 7.04%; N, 22.30%.

(u) *2,7 - dimorpholino - 4 - (3-dimethylamino-propylamino)-pyrimido-[4,5-d]-pyrimidine* from 2,7-dimorpholino-4-chloro-pyrimido-[4,5-d]-pyrimidine and 3-dimethylamino-propylamine. The product had a melting point of 243–245° C.

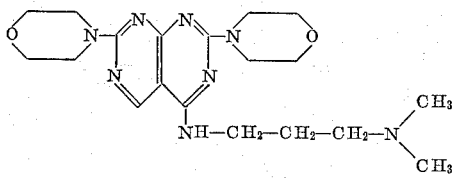

Analysis (C₁₉H₃₀N₈O₂): Molecular weight 402.51. Calculated: C, 56.79%; H, 7.34%; N, 27.84%. Found: C, 57.08%; H, 7.86%; N, 28.00%.

(v) *2 - piperidino-4-butylamino - 7 - morpholino-pyrimido-[4,5-d]-pyrimidine* from 2-piperidino-4-chloro-7-morpholino-pyrimido-[4,5-d]-pyrimidine and n-butylamine. The product had a melting point of 295–297° C. (decomposition).

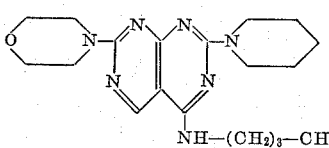
NH—(CH₂)₃—CH₃

Analysis (C₁₉H₂₉N₇O): Molecular weight 371.50. Calculated: C, 61.43%; H, 7.87%; N, 26.39%. Found: C, 61.70%; H, 8.03%; N, 26.25%.

(w) *2-piperidino - 4 - pyrrolidino - 7 - morpholino-pyrimido-[4,5-d]-pyrimidine* from 2-piperidino - 4 - chloro-7- morpholino-pyrimido-[4,5-d]-pyrimidine and pyrrolidine. The product had a melting point of 231–232° C.

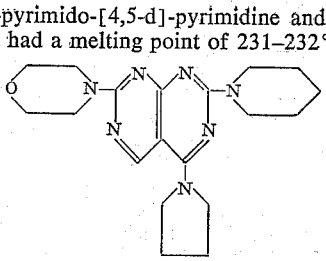

Analysis (C₁₉H₂₇N₇O): Molecular weight 369.48. Calculated: C, 61.77%; H, 7.37%; N, 26.54%. Found: C, 61.70%; H, 7.67%; N, 26.25%.

(x) *2,7 - dimorpholino - 4 - dimethylamino - pyrimido-[4,5-d]-pyrimidine* from 2,7-dimorpholino-4-chloro-pyrimido-[4,5-d]-pyrimidine and dimethylamine. The reaction product had a melting point of 205–207° C.

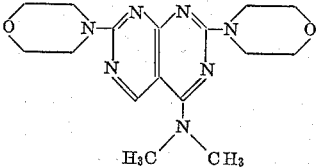

Analysis (C₁₆H₂₃N₇O₂): Molecular weight 345.42. Calculated: C, 55.63%; H, 6.71%; N, 28.39%. Found: C, 55.85%; H, 6.95%; N, 28.65%.

(y) *2,7-dimorpholino - 4 - di-n-propylamino-pyrimido-[4,5-d]-pyrimidine* from 2,7-dimorpholino-4-chloro-pyrimido-[4,5-d]-pyrimidine and dipropylamine. The reaction product had a melting point of 151–153° C.

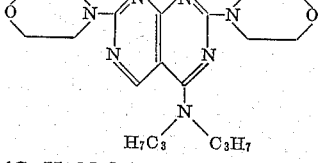

Analysis (C₂₀H₃₁N₇O₂): Molecular weight 401.52. Calculated: C, 59.83%; H, 7.78%; N, 24.42%. Found: C, 60.10%; H, 7.88%; N, 24.55%.

(z) *2,7-dimorpholino - 4 - di - n - butylamino-pyrimido-[4,5-d]-pyrimidine* from 2,7-dimorpholino-4 - chloro-pyrimido-[4,5-d]-pyrimidine and dibutylamine. The reaction product had a melting point of 110–111° C.

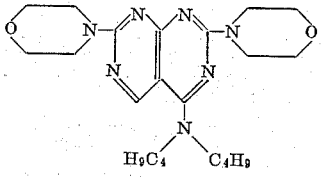

Analysis (C₂₂H₃₅N₇O₂): Molecular weight 429.58. Calculated: C, 61.51%; H, 8.21%; N, 22.83%. Found: C, 61.70%; H, 8.43%; N, 23.04%.

(aa) *2,7-dimorpholino - 4 - diallylamino - pyrimido-[4,5-d]-pyrimidine* from 2,7-dimorpholino-4-chloro-pyrimido-[4,5-d]-pyrimidine and diallylamine. The reaction product had a melting point of 151–153° C.

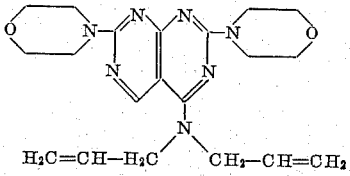

Analysis (C₂₀H₂₇N₇O₂): Molecular weight 397.49. Calculated: C, 60.43%; H, 6.85%; N, 24.67%. Found: C, 60.59%; H, 7.01%; N, 24.60%.

(bb) *2-piperidino - 4 - diethylamino - 7 - morpholino-pyrimido-[4,5-d]-pyrimidine* from 2-piperidino-4-chloro-7-morpholino-pyrimido-[4,5-d]-pyrimidine and diethylamine. The reaction product had a melting point of 81–83° C.

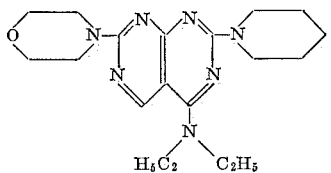

Analysis: (C₁₉H₂₉N₇O): Molecular weight 371.50. Calculated: C, 61.43%; H, 7.87%; N, 26.39%. Found: C, 61.20%; H, 7.76%; N, 26.30%.

(cc) *2,7 - dimorpholino - 4 - methylamino - pyrimido-[4,5-d]-pyrimidine* from 2,7-dimorpholino-4-chloro-pyrimido-[4,5-d]-pyrimidine and methylamine. The reaction product had a melting point of 286–288° C.

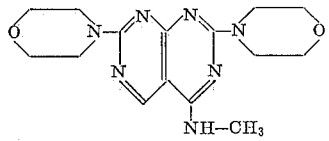

Analysis (C₁₅H₂₁N₇O₂): Molecular weight 331.39. Calculated: C, 54.37%; H, 6.39%; N, 29.59%. Found: C, 54.20%; H, 6.51%; N, 29.45%.

(dd) *2,7-dimorpholino-4-ethylamino-pyrimido-[4,5-d]-pyrimidine* from 2,7 - dimorpholino-4 - chloro-pyrimido-[4,5-d]-pyrimidine and ethylamine. The reaction product had a melting point of 297–300° C.

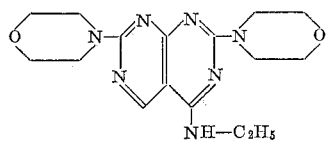

Analysis (C₁₆H₂₃N₇O₂): Molecular weight 345.42. Calculated C, 55.64%; H, 6.71%; N, 28.39%. Found: C, 55.47%; H, 6.87%; N, 28.55%.

(ee) *2,7 - dimorpholino - 4 - isobutylamino - pyrimido-[4,5-d]-pyrimidine* from 2,7-dimorpholino-4-chloro- pyrimido-[4,5-d]-pyrimidine and isobutylamine. The reaction product had a melting point of 325–328° C.

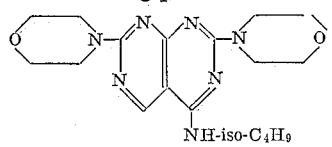

Analysis (C₁₈H₂₇N₇O₂): Molecular weight 373.47. Calculated: C, 57.89%; H, 7.29%; N, 26.26%. Found: C, 58.10%; H, 7.43%; N, 26.05%.

(ff) *2,7-dimorpholino-4 - allylamino-pyrimido-[4,5-d]-pyrimidine* from 2,7-dimorpholino-4-chloro-pyrimido-[4,5-d]-pyrimidine and allylamine. The reaction product had a melting point of 295–297° C.

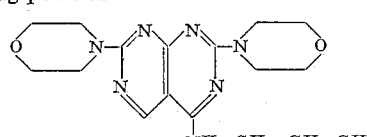

Analysis (C₁₇H₂₃N₇O₂): Molecular weight 357.43. Calculated: C, 57.13%; H, 6.49%; N, 27.43%. Found: C, 57.00%; H, 6.71%; N, 27.61%.

EXAMPLE III

*Various 2,4,7-triamino-pyrimido-[4,5-d]-pyrimidines*

(a) *2,4,7-tripiperidino-pyrimido - [4,5-d]pyrimidine.*—1.5 gm. (0.0045 mol) of 2,7-dipiperidino-4-chloro-pyrimido-[4,5-d]-pyrimidine (prepared by chlorination of the compound obtained in Example I b) were refluxed with 30 cc. (0.33 mol) of piperidine for 1.5 hours. The piperidine hydrochloride which precipitated out during this time was filtered off, and the filtrate was poured into water. The reaction product precipitated out. It was separated and recrystallized from a mixture of ethanol and water (1:1), whereupon it had a melting point of 131–132° C. Yield: 1.1 gm. (64% of theory).

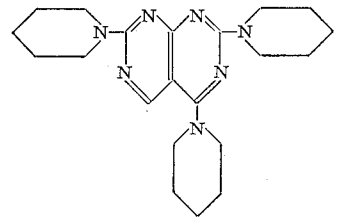

Analysis (C₂₁H₃₁N₇): Molecular weight 381.51. Calculated: C, 66.12%; H, 8.19%; N, 25.70%. Found: C, 66.30%; H, 8.40%; N, 26.00%.

(b) *2,7-dipiperidino-4 - morpholino-pyrimido-[4,5-d]-pyrimidine.*—4.0 gm. (0.012 mol) of 2,7-dipiperidino-4-chloro-pyrimido-[4,5-d]-pyrimidine were dissolved in 50 cc. (0.575 mol) of morpholine, and the resulting solution was refluxed for four hours. Thereafter, the reaction solution was concentrated by evaporation to about one-half its volume, poured into water, and the reaction product which precipitated out was filtered off. It was recrystallized from ethyl acetate in the presence of animal charcoal, whereupon it had a melting point of 172–173° C. Yield: 3.4 gm. (73% of theory).

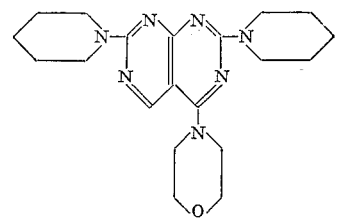

Analysis (C₂₀H₂₉ON₇): Molecular weight 383.51. Calculated: C, 62.64%; H, 7.62%; N, 25.57%. Found: C, 62.90%; H, 7.76%; N, 25.65%.

Using a procedure analogous to that described in (b) but shortening or prolonging the reaction time and varying the reaction temperature, as required, the following tribasic-substituted pyrimido-pyrimidines were also prepared:

(c) *2,7 - dipiperidino - 4-pyrrolidino-pyrimido-[4,5-d]-pyrimidine* from 2,7 - dipiperidino - 4 - chloro-pyrimido-[4,5-d]-pyrimidine and pyrrolidine. The product had a melting point of 212–214° C.

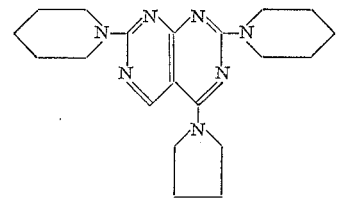

Analysis (C₂₀H₂₉N₇): Molecular weight 367.51. Calculated: C, 65.37%; H, 7.95%; N, 26.68%. Found: C, 65.25%; H, 8.47%; N, 26.30%.

(d) *2,7 - dipiperidino - 4 - (n - butylamino)-pyrimido-[4,5-d]-pyrimidine* from 2,7-dipiperidino-4-chloro-pyrimido-[4,5-d]-pyrimidine and n-butylamine. The product had a melting point of 294–296° C. (decomposition).

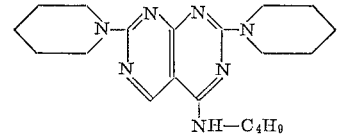

Analysis (C₂₀H₃₁N₇): Molecular weight 369.52. Calculated: C, 65.01%; H, 8.46%; N, 26.54%. Found: C, 65.00%; H, 8.66%; N, 26.20%.

(e) *2,7 - dipiperidino - 4 - hydrazino-pyrimido-[4,5-d]-pyrimidine.*—4.0 gm. (0.012 mol) of 2,7-dipiperidino-4-chloropyrimido-[4,5-d]-pyrimidine were heated on an oil bath with 90 cc. (1.44 mol) of hydrazine hydrate (80%) at 180° C. (oil bath temperature) for five hours, accompanied by vigorous stirring. The reaction product which separated out during this time was separated by filtration and recrystallized twice from dimethylformamide, whereupon it had a melting point of 265–267° C. (decomposition). Yield: 2.0 gm. (50% of theory).

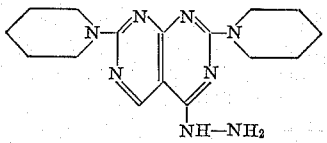

Analysis ($C_{16}H_{24}N_8$): Molecular weight 328.44. Calculated: C, 58.51%; H, 7.37%; N, 34.12%. Found: C, 58.45%; H, 7.82%; N, 34.10%.

(f) *2,7 - dipiperidino - 4 - diethylamino-pyrimido-[4,5-d]-pyrimidine* from 2,7 - dipiperidino-4-chloro-pyrimido-[4,5-d]-pyrimidine and diethylamine. The product had a melting point of 93° C.

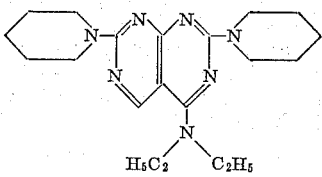

Analysis ($C_{20}H_{31}N_7$): Molecular weight 369.52. Calculated: C, 65.01%; H, 8.46%; N, 26.54%. Found: C, 65.15%; H, 8.93%; N, 26.25%.

(g) *2,7 - dipiperidino - 4 - cyclohexylamino-pyrimido-[4,5-d]-pyrimidine* from 2,7-dipiperidino-4-chloro-pyrimido-[4,5-d]-pyrimidene and cyclohexylamine. The product had a melting point of 341–343° C. (decomposition).

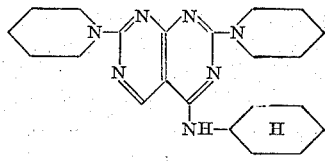

Analysis ($C_{22}H_{33}N_7$): Molecular weight 395.56. Calculated: C, 66.80%; H, 8.41%; N, 24.79%. Found: C, 66.90%; H, 8.73%; N, 25.00%.

(h) *2,7 - dipiperidino - 4 - propylamino-pyrimido-[4,5-d]-pyrimidine* from 2,7-dipiperidino-4-chloro-pyrimido-[4,5-d]-pyrimidine and n-propylamine. The product had a melting point of 329° C.

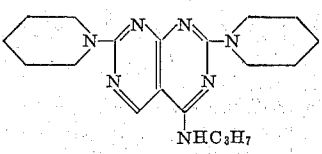

Analysis ($C_{19}H_{29}N_7$): Molecular weight, 355.50. Calculated: N, 27.59%. Found: N, 27.50%.

(i) *2,7 - dipiperidino - 4 - (2 - methylmorpholino)-pyrimido-[4,5-d]-pyrimidine* from 2,7-dipiperidino-4-chloro-pyrimido-[4,5-d]-pyrimidine and 2 - methylmorpholine. The reaction product had a melting point of 145–147° C.

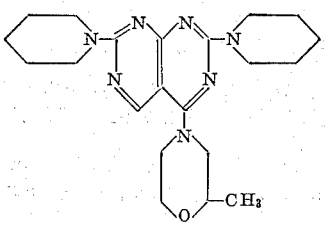

Analysis ($C_{21}H_{31}N_7O$): Molecular weight, 397.53. Calculated: C, 63.45%; H, 7.86%; N, 24.67%. Found: C, 63.25%; H, 8.04%; N, 24.45%.

(j) *2,7 - dipiperidino - 4 - dimethylamino - pyrimido-[4,5-d]-pyrimidine* from 2,7-dipiperidino-4-chloro-pyrimido-[4,5-d]-pyrimidine and dimethylamine. The reaction product had a melting point of 176–178° C.

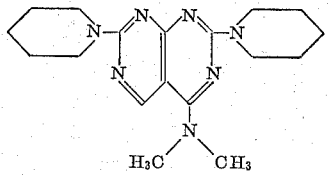

Analysis ($C_{18}H_{27}N_7$): Molecular weight, 341.47. Calculated: C, 63.31%; H, 7.97%; N, 28.72%. Found: C, 63.50%; H, 8.14%; N, 28.58%.

(k) *2,7 - dipiperidino - 4 - di-n-propylamino-pyrimido-[4,5-d]-pyrimidine* from 2,7-dipiperidino-4-chloro-pyrimido-[4,5-d]-pyrimidine and dipropylamine. The reaction product had a melting point of 84–85° C.

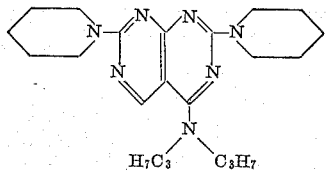

Analysis ($C_{22}H_{35}N_7$): Molecular weight, 397.58. Calculated: C, 66.46%; H, 8.87%; N, 24.66%. Found: C, 66.23%; H, 9.01%; N, 24.79%.

(l) *2,7 - dipiperidino - 4 - di-n-butylamino - pyrimido-[4,5-d]-pyrimidine* from 2,7-dipiperidino-4-chloro-pyrimido-[4,5-d]-pyrimidine and dibutylamine. The reaction product had a melting point of 92–94° C.

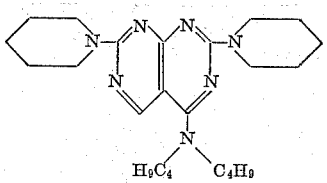

Analysis ($C_{24}H_{39}N_7$): Molecular weight, 425.63. Calculated: C, 67.72%; H, 9.24%; N, 23.04%. Found: C, 67.65%; H, 9.37%; N, 22.89%.

(m) *2,7 - dipiperidino - 4 - isopropylamino - pyrimido-[4,5-d]-pyrimidine* from 2,7-dipiperidino-4-chloro-pyrimido-[4,5-d]-pyrimidine and isopropylamine. The reaction product had a melting point of 317–318° C.

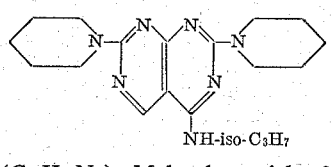

Analysis ($C_{19}H_{29}N_7$): Molecular weight, 355.50. Calculated: C, 64.19%; H, 8.22%; N, 27.58%. Found: C, 64.30%; H, 8.40%; N, 27.47.

(n) *2,7-dipiperidino-4-isoamylamino-pyrimido-[4,5-d]-pyrimidine* from 2,7-dipiperidino-4-chloro-pyrimido- [4,5-d]-pyrimidine and isoamylamine. The reaction product had a melting point of 285–287° C.

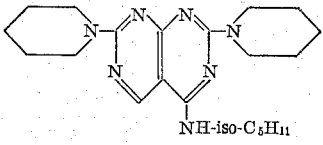

Analysis ($C_{21}H_{33}N_7$: Molecular weight 383.55. Calculated: C, 65.76%; H, 8.67%; N, 25.56%. Found: C, 65.98%; H, 8.81%; N, 25.70%.

EXAMPLE IV

Various 2,4,7-triamino-pyrimido-[4,5-d]-pyrimidines (a) *2,4,7-tripyrrolidino-pyrimido-[4,5-d]-pyrimidine.*—1.2 gm. (0.004 mol) of 2,7-dipyrrolidino-4-chloro-pyrimido-[4,5-d]-pyrimidine (prepared by chlorinating the compound obtained in Example I(c) were refluxed with 20 cc. (0.24 mol) of pyrrolidine for two hours. The crystalline reaction product precipitated out during this tme. It was separated and recrystallized from ethanol in the presence of animal charcoal, whereupon it had a melting point of 198–199° C. Yield: 1 gm. (74% of theory).

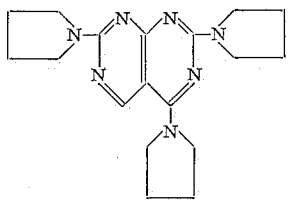

Analysis ($C_{18}H_{25}N_7$): Molecular weight 339.45. Calculated: C, 63.69%; H, 7.42%; N, 28.89%. Found: C, 64.00%; H, 7.68%; N, 28.80%.

(b) *2,7-dipyrrolidino-4-piperidino-pyrimido-[4,5-d]-pyrimidine.*—4.0 gm. (0.013 mol) of 2,7-dipyrrolidino-4-chloro-pyrimido-[4,5-d]-pyrimidine were dissolved in 30 cc. (0.33 mol) of piperidine, and the resulting solution was refluxed for five hours. After cooling, the reaction solution was poured into water. The reaction product which precipitated out was separated by filtration. It was recrystallized twice from ethyl acetate in the presence of animal charcoal, whereupon it had a melting point of 183–184° C. Yield: 2.5 gm. (60% of theory).

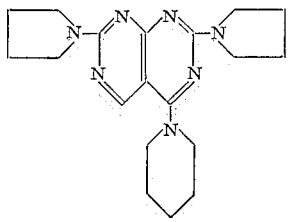

Analysis ($C_{19}H_{17}N_7$): Molecular weight 353.48. Calculated: C, 64.56%; H, 7.70%; N, 27.74%. Found: C, 64.80%; H, 7.95%; N, 27.30%.

Using procedures analogous to that described in (b) above, the following tribasic-substituted pyrimido-pyrimidines were also prepared:

(c) *2,7 - dipyrrolidino - 4 - morpholino-pyrimido-[4,5-d]-pyrimidine* from 2,7-dipyrrolidino-4-chloro-pyrimido-[4,5-d]-pyrimidine and morpholine. The product had a melting point of 202–204° C.

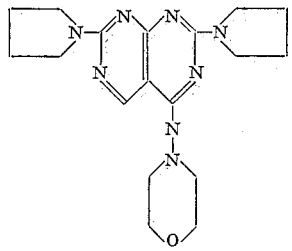

Analysis ($C_{18}H_{25}N_7$): Molecular weight 355.46. Calculated: C, 60.82%; H, 7.09%; N, 27.59%. Found: C, 60.90%; H, 7.57%; N, 27.65%.

(d) *2,7-dipyrrolidino-4-butylamino-pyrimido-[4,5 - d]-pyrimidine* from 2,7 - dipyrrolidino - 4 - chloro - pyrimido-[4,5-d]-pyrimidine and n-butylamine. The product had a melting point of 323–324° C.

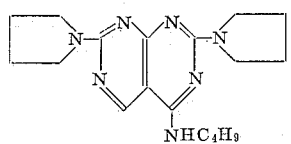

Analysis ($C_{18}H_{27}N_7$): Molecular weight 341.47. Calculated: C, 63.32%; H, 7.97%; N, 28.72%. Found: C, 63.80%; H, 8.08%; N, 28.20%.

(e) *2,7-dipyrrolidino-4-benzylamino-pyrimido-[4,5-d]-pyrimidine* from 2,7 - dipyrrolidino - 4 - chloro-pyrimido-[4,5-d]-pyrimidine and benzylamine. The product had a melting point of 309–310° C.

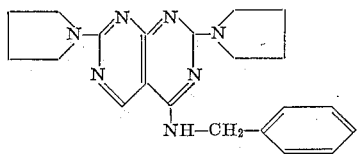

Analysis ($C_{21}H_{25}N_7$): Molecular weight 375.49. Calculated: C, 67.17%; H, 6.71%; N, 26.11%. Found: C, 67.00%; H, 7.00%; N, 25.90%.

(f) *2,7-dipyrrolidino-4-propylamino-pyrimido-[4,5-d]-pyrimidine* from 2,7-dipyrrolidino - 4 - chloro-pyrimido-[4,5-d]-pyrimidine and n-propylamine. The product had a melting point higher than 350° C.

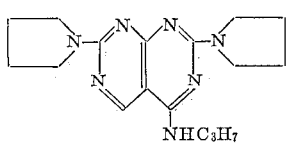

Analysis ($C_{17}H_{25}N_7$): Molecular weight 327.45. Calculated: C, 62.36%; H, 7.70%. Found: C, 62.30%; H, 8.28%.

(g) *2,7-dipyrrolidino-4-(2-methylmorpholino) - pyrimido-[4,5-d]-pyrimidine* from 2,7-dipyrrolidino-4-chloro-pyrimido-[4,5-d]-pyrimidine and 2-methylmorpholine. The reaction product has a melting point of 160–161° C.

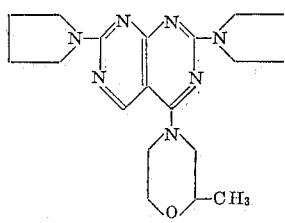

Analysis ($C_{19}H_{27}N_7O$): Molecular weight 369.48. Calculated: C, 61.76%; H, 7.37%; N, 26.54%. Found: C, 61.70%; H, 7.52%; N, 26.38%.

(h) *2,7-dipyrrolidino - 4 - dimethylamino - pyrimido-[4,5-d]-pyrimidine* from 2,7-dipyrrolidino - 4 - chloro-pyrimido-[4,5-d]-pyrimidine and dimethylamine. The reaction product had a melting point of 178–180° C.

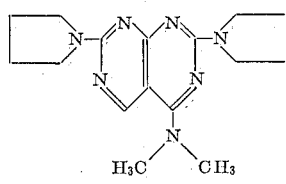

Analysis ($C_{16}H_{23}N_7$): Molecular weight 313.42. Calculated: C, 61.31%; H, 7.40%; N, 31.29%. Found: C, 61.20%; 7.61%; 31.05%.

(i) *2,7-dipyrrolidino-4-diethylamino-pyrimido-[4,5-d]-pyrimidine* from 2,7-dipyrrolidino-4 - chloro - pyrimido

[4,5-d]-pyrimidine and diethylamine. The reaction product had a melting point of 117–119° C.

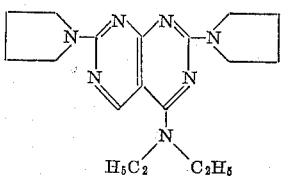

Analysis (C₁₈H₂₇N₇): Molecular weight 341.47. Calculated: C, 63.31%; H, 7.97%; N, 28.72%. Found: C, 63.40%; H, 8.18%; N, 28.59%.

(*j*) *2,7-dipyrrolidino-4-di-n-propylamino-pyrimido-[4,5-d]-pyrimidine* from 2,7-dipyrrolidino-4-chloropyrimido-[4,5-d]-pyrimidine and dipropylamine. The reaction product has a melting point of 156–157° C.

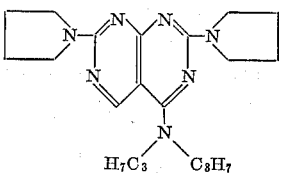

Analysis (C₂₀H₃₁N₇): Molecular weight 369.52. Calculated: C, 65.01%; H, 8.46%; N, 26.53%. Found: C, 64.88%; H, 8.63%; N, 26.50%.

(*k*) *2,7-dipyrrolidino-4-di-n-butylamino-pyrimido-[4,5-d]-pyrimidine* from 2,7-dipyrrolidino-4-chloropyrimido-[4,5-d]-pyrimidine and dibutylamine. The reaction product had a melting point of 136° C.

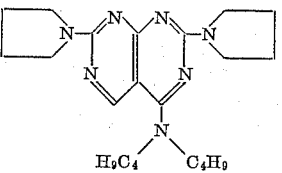

Analysis (C₂₂H₃₅N₇): Molecular weight 397.58. Calculated: C, 66.46%; H, 8.87%; N, 24.66%. Found: C, 66.18%; H, 9.04%; N, 24.66%.

(*l*) *2,7-dipyrrolidino-4-isoamylamino-pyrimido-[4,5-d]-pyrimidine* from 2,7-dipyrrolidino-4-chloropyrimido-[4,5-d]-pyrimidine and isoamylamine. The reaction product had a melting point of 310–312° C.

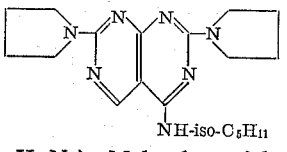

Analysis (C₁₉H₂₉N₇): Molecular weight 355.50. Calculated: C, 64.19%; H, 8.22%; N, 27.58%: Found: C, 64.20%; H, 8.30%; N, 27.68%.

EXAMPLE V

*Acid addition salt of a 2,4,7-triamino-pyrimido-[4,5-d]-pyrimidine*

0.5 gm. (0.0013 mol) of 2,7-dipiperidino-4-diethylamino-pyrimido-[4,5-d]-pyrimidine was dissolved in 100 cc. of absolute ether, and then ethereal hydrochloric acid was added to the solution until it was acid to Congo red. The precipitate was separated by filtration and dried. Melting point was 240–242° C. Yield: 0.48 gm. (91% of theory).

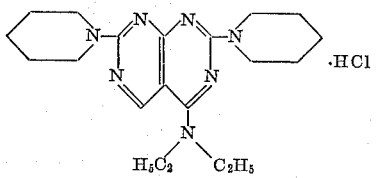

Analysis (C₂₀H₃₂ClN₇): Molecular weight 405.98: Calculated: Cl, 8.73%. Found: Cl 8.68%.

EXAMPLE VI

*Various 2,7-diamino-4-(lower alkoxy)-pyrimido-[4,5-d]-pyrimidines*

(*a*) *2,7 - dimorpholino - 4 - ethoxy - pyrimido - [4,5-d]-pyrimidine.*—5.0 gm. (0.015 mol) of 2,7-dimorpholino-4-chloro-[4,5-d]-pyrimidine were dissolved in 500 cc. of absolute ethanol. A solution of 0.4 gm. (0.017 mol) of sodium in 20 cc. absolute ethanol was added thereto and the resulting mixture was refluxed for two hours. The precipitated sodium chloride was separated by vacuum filtration, and the filtrate was evaporated to dryness. After recrystallization from ethanol in the presence of animal charcoal, it had a melting point of 218–220° C. Yield: 2.9 gm. (59% of theory).

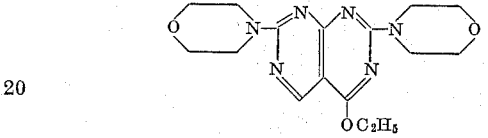

Analysis (C₁₆H₂₂N₆O₃): Molecular weight 346.40. Calculated: C, 55.48%; H, 6.40%; N, 24.26%. Found: C, 55.30%; H, 6.69%; N, 24.00%.

Using a procedure analogous to that described in (*a*) above, the following compounds were also prepared:

(*b*) *2,7 - dimorpholino - 4 - methoxy - pyrimido - [4,5-d]-pyrimidine* from 2,7-dimorpholino-4-chloro-pyrimido-[4,5-d]-pyrimidine and sodium methylate. The product had a melting point of 263–264° C.

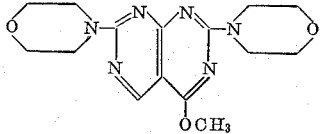

Analysis (C₁₅H₂₀N₆O₃): Molecular weight 332.38. Calculated: C, 54.17%; H, 6.06%; N, 25.32%. Found: C, 54.05%; H, 6.24%; N, 25.55%.

(*c*) *2,7 - dimorpholino - 4 - propoxy - pyrimido - [4,5-d]-pyrimidine* from 2,7-dimorpholino-4-chloro-pyrimido-[4,5-d]-pyrimidine and sodium propylate. The product had a melting point of 206–207° C.

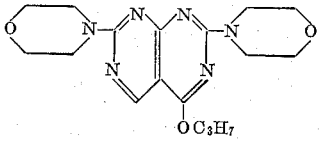

Analysis (C₁₇H₂₄N₆O₃): Molecular weight 360.43. Calculated: C, 56.65%; H, 6.71%; N, 23.32%. Found: C, 56.20%; H, 6.93%; N, 22.90%.

(*d*) *2,7 - dimorpholino - 4 - butoxy - pyrimido - [4,5-d]-pyrimidine* from 2,7-dimorpholino-4-chloro-pyrimido-[4,5-d]-pyrimidine and sodium butylate. The product had a melting point of 149–151° C.

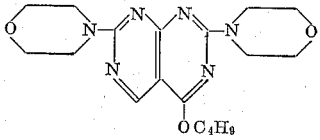

Analysis (C₁₈H₂₆N₆O₃): Molecular weight 374.42. Calculated: C, 57.76%; H, 7.00%; N, 22.43%. Found: C, 57.55%; H, 7.38%; N, 22.55%.

The same compound was obtained when 5.0 gm. of 2,7-dimorpholino-4-chloro-pyrimido-[4,5-d]-pyrimidine were dissolved in 100 cc. of dry n-butanol and the resulting solution was refluxed for eight hours.

(*e*) *2,7 - dipyrrolidino - 4 - methoxy - pyrimido - [4,5-d]-pyrimidine* from 2,7-dipyrrolidino-4-chloro-pyrimido-

[4,5-d]-pyrimidine and sodium methylate. The product had a melting point of 216–218° C.

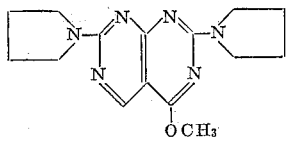

Analysis (C₁₅H₂₀N₆O): Molecular weight 300.38. Calculated: C, 60.00%; H, 6.71%; N, 27.96%. Found: C, 59.90%; H, 6.98%; N, 27.75%.

(f) 2,7 - dipyrrolidino - 4 - ethoxy - pyrimido - [4,5-d]-pyrimidine from 2,7-dipyrrolidino-4-chloro-pyrimido-[4,5-d]-pyrimidine and sodium ethylate. The product had a melting point of 178–179° C.

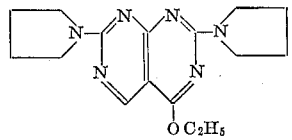

Analysis (C₁₆H₂₂N₆O): Molecular weight 314.40. Calculated: C, 61.13%; H, 7.05%; N, 26.73%. Found: C, 61.40%; H, 7.60%; N, 26.35%.

(g) 2,7 - dimorpholino - 4 - (2 - ethoxy) - ethoxy-pyrimido-[4,5-d]-pyrimidine.—A suspension of 3.4 gm. (0.01 mol) of 2,7-dimorpholino-4-chloro-pyrimido-[4,5-d]-pyrimidine in 75 cc. of absolute tetrahydrofuran was added to a solution of 0.25 gm. (0.01 mol) of sodium and 1.8 gm. (0.02 mol) of absolute ethyl glycol in 20 cc. of absolute tetrahydrofuran. The resulting mixture was refluxed for five hours, accompanied by stirring. After cooling, the precipitated sodium chloride was filtered off and the filtrate was evaporated to dryness. After recrystallization from ethyl acetate and petroleum ether, the residue had a melting point of 106° C. Yield: 2.0 gm. (51% of theory).

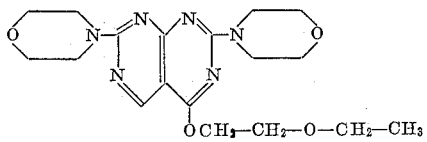

Analysis (C₁₈H₂₆N₆O₄): Molecular weight 390.46. Calculated: C, 55.39%; H, 6.71%; N, 21.52%. Found: C, 55.10%; H, 6.88%; N, 21.80%.

(h) 2,7 - dimorpholino - 4 - (2 - dimethylamino)-ethoxy - pyrimido - [4,5 - d] - pyrimidine.—7.3 gm. (0.022 mol) of 2,7-dimorpholino-4-chloro-pyrimido-[4,5-d]-pyrimidine were added to a solution of 0.5 gm. (0.022 mol) of sodium and 25 cc. of absolute dimethylamino-ethanol in 25 cc. of absolute toluene. The resulting mixture was gently refluxed for fifty minutes accompanied by stirring. After cooling, the precipitated sodium chloride was filtered off, and the filtrate was first shaken twice with a small amount of 2N sodium hydroxide and then once with a small amount of water and finally dried over sodium sulfate. The solution was then evaporated and the residue was recrystallized from a mixture of toluene and petroleum ether, whereupon it had a melting point of 105–107° C. Yield: 3.3 gm. (39% of theory).

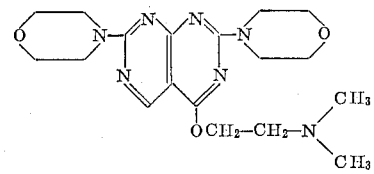

Analysis (C₁₈H₂₇N₇O₃): Molecular weight 389.47. Calculated: C, 55.50%; H, 6.99%; N, 25.18%. Found: C, 55.21%; H, 7.30%; N, 24.95%.

(i) 2,7 - dimorpholino - 4 - (2 - piperidino) - ethoxy-pyrimido - [4,5 - d] - pyrimidine from 2,7 - dimorpholino-4-chloro-pyrimido-[4,5-d]-pyrimidine and sodium piperidino-ethylate. The product had a melting point of 127–129° C.

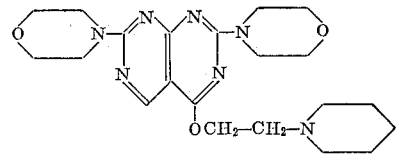

Analysis: (C₂₁H₃₁N₇O₃): Molecular weight 429.53. Calculated: C, 58.73%; H, 7.28%; N, 22.82%. Found: C, 58.46%; H, 7.57%; N, 22.50%.

(j) 2 - piperidino - 7 - morpholino - 4 - ethoxy - pyrimido-[4,5-d]-pyrimidine from 2-piperidino-7-morpholino-4-chloro-pyrimido-[4,5-d]-pyrimidine and sodium ethylate. The product had a melting point of 176–177° C.

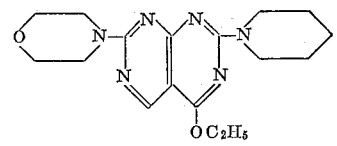

Analysis (C₁₇H₂₄N₆O₂): Molecular weight 344.43. Calculated: C, 59.28%; H, 7.02%; N, 24.40%. Found: C, 59.75%; H, 7.57%; N, 24.20%.

(k) 2,7 - bis - (2 - methylmorpholino) - 4 - methoxy-pyrimido-[4,5-d]-pyrimidine from 2,7-bis-(2-methylmorpholine)-4-chloro-pyrimido-[4,5-d]-pyrimidine and sodium-methylate. The product had a melting point of 198–199° C.

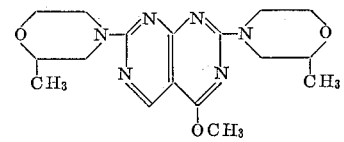

Analysis (C₁₇H₂₄N₆O₃): Molecular weight 360.43. Calculated: C, 56.65%; H, 6.71%; N, 23.32%. Found: C, 56.50%; H, 6.85%; N, 23.20%.

(l) 2,7 - bis - (2 - methylmorpholino) - 4 - ethoxy - pyrimido-[4,5-d]-pyrimidine from 2,7-bis-(2-methylmorpholino)-4-chloro-pyrimido-[4,5-d]-pyrimidine and sodium ethylate. The product had a melting point of 158° C.

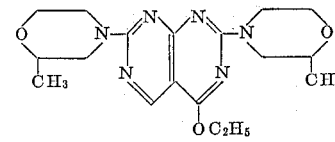

Analysis (C₁₈H₂₆N₆O₃): Molecular weight 374.46. Calculated: C, 57.74%; H, 7.00%; N, 22.44%. Found: C, 57.75%; H, 7.15%; N, 22.55%.

(m) 2,7 - bis - (2 - methylmorpholino) - 4 - propoxy-pyrimido-[4,5-d]-pyrimidine from 2,7-bis-(2-methylmorpholino)-4-chloro-pyrimido-[4,5-d]-pyrimidine and sodium propylate. The product had a melting point of 151–153° C.

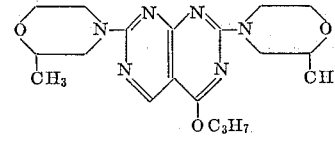

Analysis (C₁₉H₂₈N₆O₃): Molecular weight 388.48. Calculated: C, 58.75%; H, 7.26%; N, 21.64%. Found: C, 59.00%; H, 7.46%; N, 21.55%.

(n) 2,7 - bis - (2-methylmorpholino)-4-isopropoxy-pyrimido-[4,5-d]-pyrimidine from 2,7-bis-(2-methylmorpholino)-4-chloro-pyrimido-[4,5-d]-pyrimidine and sodium isopropylate. The product had a melting point of 180–181° C.

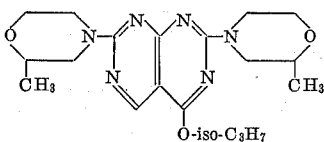

Analysis ($C_{19}H_{29}N_6O_3$): Molecular weight 388.48. Calculated: C, 58.75%; H, 7.26%; N, 21.64%. Found: C, 58.80%; H, 7.41%; N, 21.58%.

(o) *2,7 - bis - (2-methylmorpholino)-4-isobutoxy-pyrimido-[4,5-d]-pyrimidine* from 2,7-bis-(2-methylmorpholino)-4-chloro-pyrimido-[4,5-d]-pyrimidine and sodium isobutylate. The product had a melting point of 151–152° C.

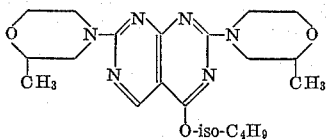

Analysis ($C_{20}H_{30}N_6O_3$): Molecular weight 402.51. Calculated: C, 59.68%; H, 7.51%; N, 20.88%. Found: C, 59.70%; H, 7.69%; N, 20.65%.

(p) *2,7 - bis - (2 - methylmorpholino)-4-allyloxy-pyrimido-[4,5-d]-pyrimidine* from 2,7-bis-(2-methylmorpholino)-4-chloro-pyrimido-[4,5-d]-pyrimidine and sodium allylate. The product had a melting point of 153–155° C.

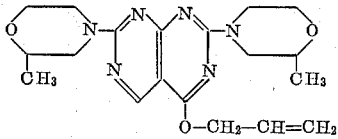

Analysis ($C_{19}H_{26}N_6O_3$): Molecular weight 386.47. Calculated: C, 59.04%; H, 6.78%; N, 21.73%. Found: C, 59.10%; H, 6.94%; H, 21.85.

(q) *2,7 - bis - (N'-methyl-piperazino)-4-ethoxy-pyrimido-[4,5-d]-pyrimidine* from 2,7-bis-(N'-methylpiperazino)-4-chloro-pyrimido-[4,5-d]-pyrimidine and sodium ethylate. The product had a melting point of 105–107° C.

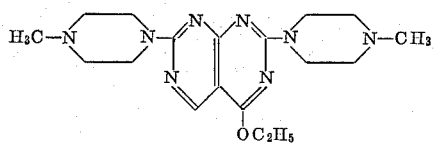

Analysis ($C_{18}H_{28}N_8O$): Molecular weight 372.49. Calculated: C, 58.04%; H, 7.58%; N, 30.08%. Found: C, 58.18%; H, 7.79%; N, 30.01%.

(t) *2,7 - dimorpholino-4-allyloxy-pyrimido-[4,5-d]-pyrimidine* from 2,7 - dimorpholino - 4 - chloro - pyrimido - [4,5-d]-pyrimidine and sodium allylate. The reaction product had a melting point of 202–203° C.

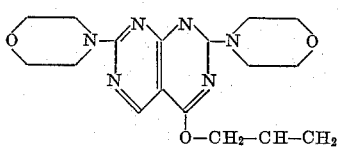

Analysis ($C_{17}H_{22}N_6O_3$): Molecular weight 358.41. Calculated: C, 56.97%; H, 6.19%; N, 23.45%. Found: C, 56.90; H, 6.16%; N, 23.35.

(u) *2,7 - dimorpholino - 4-(2'- propoxy) - pyrimido-[4,5-d]-pyrimidine* from 2,7-dimorpholino-4-chloro-pyrimido-[4,5-d]-pyrimidine and sodium 2-propylate. The reaction product had a melting point of 233–234° C.

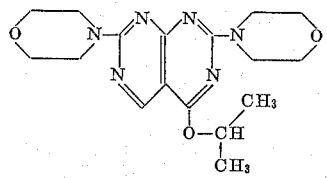

Analysis ($C_{17}H_{24}N_6O_3$): Molecular weight 360.43. Calculated: C, 56.65%; H, 6.71%; N, 23.31%. Found: C, 56.90; H, 6.84%; N, 23.60.

(v) *2,7 - dimorpholino - 4 - (2 - methyl - 1 - propoxy)-pyrimido-[4,5-d]-pyrimidine* from 2,7-dimorpholino-4-chloro-pyrimido-[4,5-d]-pyrimidine and sodium 2-methyl-1-propylate. The reaction product had a melting point of 186–188° C.

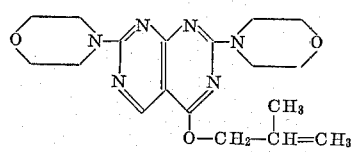

Analysis ($C_{18}H_{26}N_6O_3$): Molecular weight 374.46. Calculated: C, 57.73%; H, 7.01%; N, 22.45%. Found: C, 57.70%; H, 7.17%; N, 22.59%.

(w) *2,7 - dimorpholino - 4 - (3 - methyl - 1 - butoxy)-pyrimido-[4,5-d]-pyrimidine* from 2,7 - dimorpholino - 4-chloro-pyrimido-[4,5-d]-pyrimidine and sodium 3-methyl-1-butylate. The reaction product had a melting point of 127–128° C.

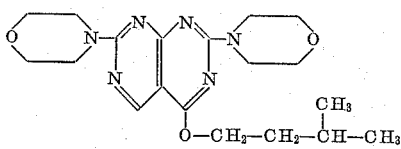

Analysis ($C_{19}H_{28}N_6O_3$): Molecular weight 388.48. Calculated: C, 58.74%; H, 7.27%; N, 21.64%. Found: C, 58.70%; H, 7.32%; N, 21.45%.

(x) *2,7 - dimorpholino - 4 - (2 - butoxy) - pyrimido-[4,5-d] - pyrimidine* from 2,7 - dimorpholino - 4 - chloropyrimido - [4,5-d]-pyrimidine and sodium 2 - butylate. The reaction product had a melting point of 188–189° C.

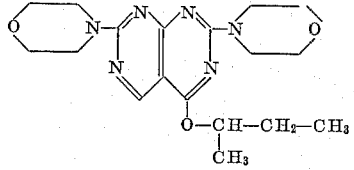

Analysis ($C_{18}H_{26}N_6O_3$): Molecular weight 374.46. Calculated: C, 57.73%; H, 7.00%; N, 22.44%. Found: C, 57.90%; H, 7.16%; N, 22.15%.

(y) *2,7 - dimorpholino - 4 - cyclohexoxy - pyrimido-[4,5-d]-pyrimidine* from 2,7-dimorpholino-4-chloro-pyrimido - [4,5-d] - pyrimidine and sodium cyclohexylate. The reaction product had a melting point of 200–201° C.

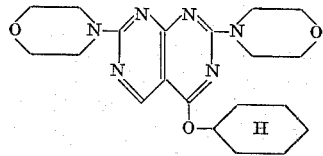

Analysis ($C_{20}H_{28}N_6O_3$): Molecular weight 400.49. Calculated: C, 59.98%; H, 7.05%; N, 20.98%. Found: C, 60.10%; H, 7.12%; N, 21.19%.

(z) *2,7 - dipiperdino - 4 - methoxy - pyrimido - [4,5-d]-pyrimidine* from 2,7-dipiperdino-4-chloro-pyrimido-

[4,5-d]-pyrimidine and sodium methylate. The reaction product had a melting point of 214–216° C.

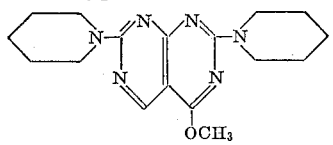

Analysis (C₁₇H₂₄N₆O): Molecular weight 328.43. Calculated: C, 62.17%; H, 7.37%; N, 25.59%. Found: C, 62.10%; H, 7.52%; N, 25.40%.

(aa) 2,7 - dipiperidino - 4 - ethoxy - pyrimido - [4,5-d]-pyrimidine from 2,7-dipiperidino-4-chloro-pyrimido-[4,5-d]-pyrimidine and sodium ethylate. The reaction product had a melting point of 155–157° C.

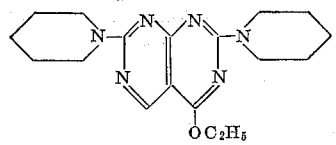

Analysis (C₁₈H₂₆N₆O): Molecular weight 342.46. Calculated: C, 63.13%; H, 7.65%; N, 24.54%. Found: C, 63.30%; H, 7.79%; N, 24.63%.

(bb) 2,7 - dipiperidino - 4 - (1 - propoxy) - pyrimido-[4,5-d] - pyrimidine from 2,7 - dipiperidino - 4 - chloro-pyrimido-[4,5-d]-pyrimidine and sodium 1 - propylate. The reaction product had a melting point of 130–131° C.

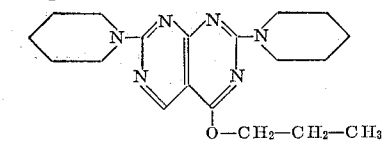

Analysis (C₁₉H₂₈N₆O): Molecular weight 356.48. Calculated: C, 64.01%; H, 7.92%; N, 23.58%. Found: C, 64.23%; H, 7.83%; N, 23.75%.

(cc) 2,7 - dipiperidino - 4 - (1 - butoxy) - pyrimido-[4,5-d] - pyrimidine from 2,7 - dipiperidino - 4 - chloro-pyrimido - [4,5-d] - pyrimidine and sodium 1 - butylate. The reaction product had a melting point of 107–108° C.

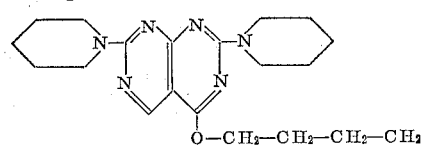

Analysis (C₂₀H₃₀N₆O): Molecular weight 370.51. Calculated: C, 64.83%; H, 8.16%; N, 22.68%. Found: C, 65.00%; H, 8.35%; N, 22.87%.

(dd) 2,7 - dipyrrolidino - 4 - (1 - propoxy) - pyrimido-[4,5-d] - pyrimidine from 2,7 - dipyrrolidino - 4 - chloro-pyrimido-[4,5-d] - pyrimidine and sodium 1 - propylate. The reaction product had a melting point of 171–172° C.

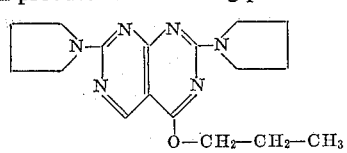

Analysis (C₁₇H₂₄N₆O): Molecular weight 328.43. Calculated: C, 62.17%; H, 7.37%; N, 25.59%. Found: C, 62.10%; H, 7.22%; N, 25.38%.

(ee) 2,7 - dipyrrolidino - 4 - (1 - hexoxy) - pyrimido-[4,5-d] - pyrimidine from 2,7 - dipyrrolidino - 4 - chloro-pyrimido-[4,5-d]-pyrimidine and sodium 1-hexylate. The reaction product had a melting point of 108–110° C.

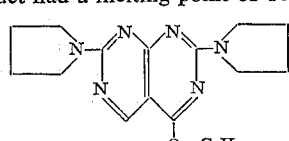

Analysis (C₂₀H₃₀N₆O): Molecular weight 370.51. Calculated: C, 64.83%; H, 8.16%; N, 22.68%. Found: C, 64.90%; H, 8.29%; N, 22.40%.

(ff) 2,7 - dipyrrolidino - 4 - allyloxy - pyrimido-[4,5-d]-pyrimidine from 2,7 - dipyrrolidino - 4 - chloro - pyrimido-[4,5-d]-pyrimidine and sodium allylate. The reaction product had a melting point of 182° C.

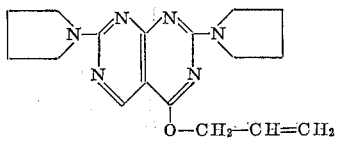

Analysis (C₁₇H₂₂N₆O): Molecular weight 326.41. Calculated: C, 62.55%; H, 6.79%; N, 25.75%. Found: C, 62.50%; H, 6.96%; N, 25.85%.

(gg) 2,7 - dipyrrolidino - 4 - (2 - propoxy) - pyrimido-[4,5-d] - pyrimidine from 2,7 - dipyrrolidino - 4 - chloro-pyrimido - [4,5-d] - pyrimidine and sodium 2-propylate. The reaction product had a melting point of 190° C.

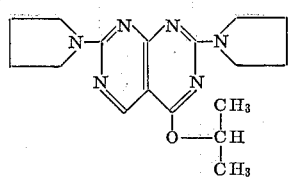

Analysis (C₁₇H₂₄N₆O): Molecular weight 328.43. Calculated: C, 62.17%; H, 7.37%; N, 25.59%. Found: C, 62.10%; H, 7.40%; N, 25.70%.

(hh) 2,7 - dipyrrolidino-4-(2-methyl-1-propoxy)-pyrimido-[4,5-d]-pyrimidine from 2,7-dipyrrolidino-4-chloro-pyrimido-[4,5-d]-pyrimidine and sodium 2-methyl-1-propylate. The reaction product had a melting point of 169–170° C.

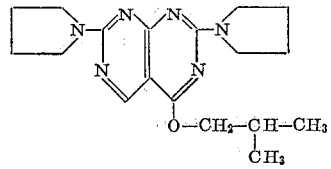

Analysis (C₁₈H₂₆N₆O): Molecular weight 342.46. Calculated: C, 63.12%; H, 7.65%; N, 24.54%. Found: C, 62.95%; H, 7.76%; N, 24.73%.

(ii) 2,7 - dipyrrolidino-4-cyclohexoxy-pyrimido-[4,5-d]-pyrimidine from 2,7-dipyrrolidino-4-chloro-pyrimido-[4,5-d]-pyrimidine and sodium cyclohexylate. The reaction product had a melting point of 165–166° C.

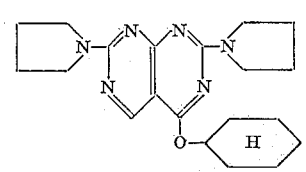

Analysis (C₂₀H₂₈N₆O): Molecular weight 368.49. Calculated: C, 65.18%; H, 7.66%; N, 22.81%. Found: C, 65.20%; H, 7.81%; N, 22.75%.

(kk) 2,7 - bis-(N'-methylpiperazino)-4-(2-propoxy)-pyrimido - [4,5-d]-pyrimidine from 2,7-bis-(N'-methylpiperazino)-4-chloro-pyrimido-[4,5-d]-pyrimidine and sodium 2-propylate The reaction product had a melting point of 171–172° C.

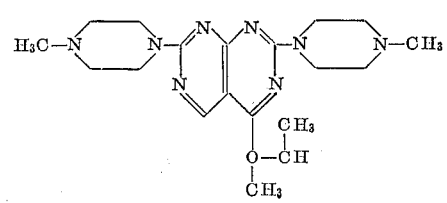

Analysis ($C_{19}H_{30}N_8O$): Molecular weight 386.51. Calculated: C, 59.04%; H, 7.82%; N, 29.00%. Found: C, 59.18%; H, 7.96%; N, 29.13%.

(*ll*) 2,7 - bis - (N'-methylpiperazino)-4-(2-methyl-1-propoxy)-pyrimido-[4,5-d]-pyrimidine from 2,7-bis(N'-methyl - piperazino) - 4-chloro-pyrimido-[4,5-d]-pyrimidine and sodium 2-methyl-1-propylate. The reaction product had a melting point of 155–157° C.

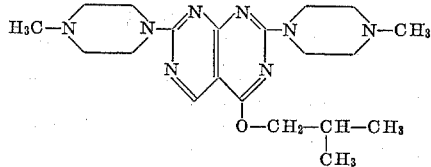

Analysis ($C_{20}H_{32}N_8O$): Molecular weight 400.54. Calculated: C, 59.97%; H, 8.05%; N, 27.98%. Found: C, 60.00%; H, 8.18%; N, 27.85%.

(*mm*) 2,7 - bis-(2-methylmorpholino)-4-(1-decoxy)-pyrimido-[4,5-d]-pyrimidine from 2,7-bis-(2-methylmorpholino)-4-chloro-pyrimido-[4,5-d]-pyrimidine and sodium 1-decylate. The reaction product had a melting point of 111–113° C.

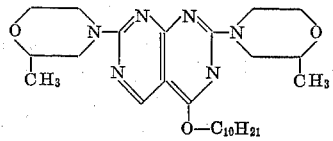

Analysis ($C_{26}H_{42}N_6O_3$): Molecular weight 486.67. Calculated: C, 64.16%; H, 8.70%; N, 17.27%. Found: C, 64.31%; H, 8.75%; N, 17.40%.

(*nn*) 2,7 - bis-(2-methylmorpholino)-4-(3-methyl-1-butoxy) - pyrimido-[4,5-d]-pyrimidine from 2,7-bis-(2-methyl - morpholino)-4-chloro-pyrimido-[4,5-d]-pyrimidine and sodium 3-methyl-1-butylate. The reaction product had a melting point of 109–111° C.

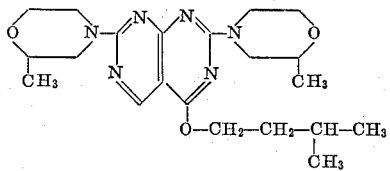

Analysis ($C_{21}H_{32}N_6O_3$): Molecular weight 416.53. Calculated: C, 60.55%; H, 7.75%; N, 20.18%. Found: C, 60.75%; H, 7.78%; N, 20.28%.

(*oo*) 2,7 - bis - (2 - methylmorpholino) - 4 - (2 - butoxy)-pyrimido-[4-5-d]-pyrimidine from 2,7-bis-(2-methylmorpholino)-4-chloro-pyrimido-[4,5-d]-pyrimidine and sodium 2-butylate. The reaction product had a melting point of 160–162° C.

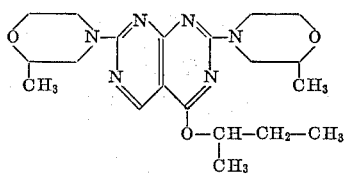

Analysis ($C_{20}H_{30}N_6O_3$): Molecular weight 402.51. Calculated: C, 59.67%; H, 7.51%; N, 20.88%. Found: C, 59.81%; H, 7.55%; N, 20.75%.

(*pp*) 2,7 - bis - (2 - methylmorpholino) - 4 - (2 - ethoxy)-pyrimido-[4,5-d]-pyrimidine from 2,7-bis-(2-methylmorpholino) - 4 - chloro - pyrimido - [4,5 - d] - pyrimidine and sodium 2-ethoxy-ethylate. The reaction product had a melting point of 118–120° C.

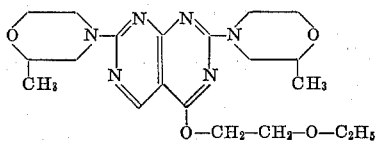

Analysis ($C_{20}H_{30}N_6O_4$): Molecular weight 418.51. Calculated: C, 57.39%; H, 7.23%; N, 20.08%. Found: C, 57.55%; H, 7.35%; N, 20.02%.

(*qq*) 2,7 - dimorpholino - 4 - (1 - hexoxy) - pyrimido-[4,5 - d] - pyrimidine from 2,7 - dimorpholino - 4 - chloro-pyrimido-[4,5-d]-pyrimidine and sodium 1-hexylate. The reaction product had a melting point of 160–162° C.

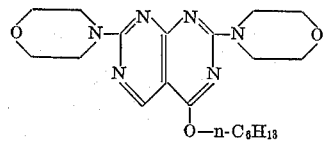

Analysis ($C_{20}H_{30}N_6O_3$): Molecular weight 402.51. Calculated: C, 59.68%; H, 7.51%; N, 20.88%. Found: C, 59.90%; H, 7.64%; N, 20.80%.

(*rr*) 2,7 - dimorpholino - 4 - (1 - decoxy) - pyrimido-[4,5 - d] - pyrimidine from 2,7 - dimorpholino - 4 - chloro-pyrimido-[4,5-d]-pyrimidine and sodium 1-decylate. The reaction product had a melting point of 137–138° C.

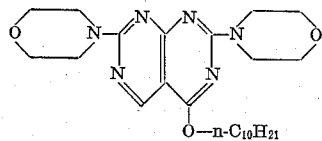

Analysis ($C_{24}H_{38}N_6O_3$): Molecular weight 458.61. Calculated: C, 62.85%; H, 8.35%; N, 18.33%. Found: C, 63.00%; H, 8.35%; N, 18.05%.

EXAMPLE VII

*Various 2,4,7 - triamino - pyrimido - [4,5 - d]-pyrimidines*

(*a*) 2,7 - bis - (2 - methylmorpholino) - 4 - morpholino-pyrimido - [4,5 - d] - pyrimidine.—3.6 gm. (0.01 mol) of 2,7 - bis - (2 - methylmorpholino) - 4 - chloro-pyrimido-[4,5-d]-pyrimidine, which was obtained by chlorinating the product of Example I(*h*), was admixed with 20 cc. (0.23 mol) of morpholine, and the resulting mixture was refluxed for two hours. The clear solution obtained thereby was evaporated to dryness in vacuo, the crystalline residue was admixed with 30 cc. of 1 N sodium hydroxide, the mixture was vacuum-filtered and the filter cake was washed with water until neutral. The washed filter cake was recrystallized from ethanol in the presence of animal charcoal. The yield was 2.8 gm. (72% of theory) of the compound having the formula

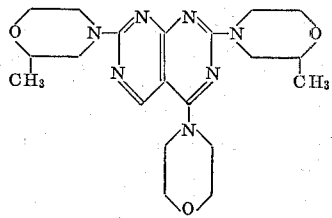

and a melting point of 176–178° C.

Analysis ($C_{20}H_{29}N_7O_3$): Molecular weight 415.51. Calculated: C, 57.81%; H, 7.04%; N, 23.60%. Found: C, 58.03%; H, 7:19%; N, 23.51%.

Using an analogous procedure, but varying the reaction periods and reaction temperatures as needed, the following additional 2,4,7-triamino-pyrimido-[4,5-d]-pyrimidines were prepared:

(*b*) 2,4,7-tris-(2-methylmorpholino) - pyrimido-[4,5-d]-pyrimidine from 2,7-bis-(2-methylmorpholino)-4 - chloropyrimido-[4,5-d]-pyrimidine and 2 - methylmorpholine. The reaction product had a melting point of 174–176° C.

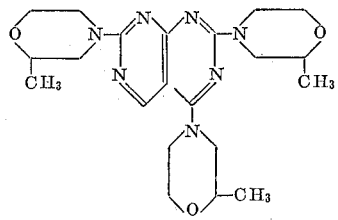

Analysis (C₂₁H₃₁N₇O₃): Molecular weight 429.53. Calculated: C, 58.72%; H, 7.28%; N, 22.83%. Found: C, 58.65%; H, 7.41%; N, 22.80%.

(c) *2,7-bis-(2-methylmorpholino)-4-n-butylamino-pyrimido-[4,5-d]-pyrimidine* from 2,7-bis-(2-methylmorpholino)-4-chloro-pyrimido-[4,5-d]-pyrimidine and n - butylamine. The reaction product had a melting point of 261–262° C.

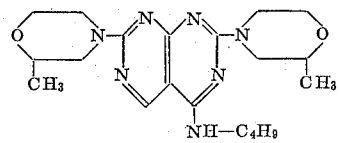

Analysis (C₂₀H₃₁N₇O₂): Molecular weight 401.52. Calculated: C, 59.83%; H, 7.78%; N, 24.42%. Found: C, 59.70%; H, 7.88%; N, 24.53%.

(d) *2,7-bis-(2-methylmorpholino)-4 - isopropylamino-pyrimido-[4,5-d]-pyrimidine* from 2,7-bis-(2-methylmorpholino)-4-chloro-pyrimido-[4,5-d] - pyrimidine and isopropylamine. The reaction product had a melting point of 305–306° C.

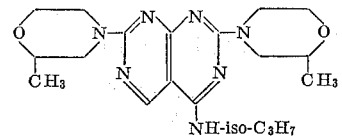

Analysis (C₁₉H₂₉N₇O₂): Molecular weight 387.50. Calculated: C, 58.89%; H, 7.54%; N, 25.31%. Found: C, 58.85%; H, 7.56%; N, 25.20%.

(e) *2,7-bis-(2-methylmorpholino) - 4 - isoamylamino-pyrimido-[4,5-d]-pyrimidine* from 2,7-bis-(2-methylmorpholino)-4-chloro-pyrimido-[4,5-d] - pyrimidine and isoamylamine. The reaction product had a melting point of 263–264° C.

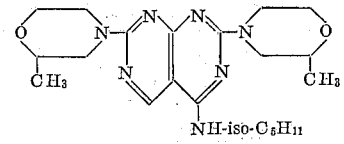

Analysis (C₂₁H₃₃N₇O₂): Molecular weight 415.55. Calculated: C, 60.70%; H, 8.00%; N, 23.60%. Found: C, 60.70%; H, 7.98%; N, 23.40%.

(f) *2,7-bis-(2-methylmorpholino) - 4 - dimethylamino-pyrimido-[4,5-d]-pyrimidine* from 2,7-bis-(2-methylmorpholino)-4-chloropyrimido-[4,5-d] - pyrimidine and dimethylamine. The reaction product had a melting point of 118–119° C.

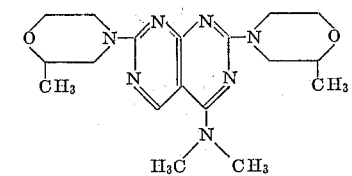

Analysis (C₁₈H₂₇N₇O₂): Molecular weight 373.47. Calculated: C, 57.82%; H, 7.29%; N, 26.26%. Found: C, 57.85%; H, 7.47%; N, 26.10%.

(g) *2,7-bis-(2-methylmorpholino)-4-diethylamino-pyrimido-[4,5-d]-pyrimidine* from 2,7-bis-(2-methylmorpholino)-4-chloro-pyrimido-[4,5-d] - pyrimidine and diethylamine. The reaction product had a melting point of 140–141° C.

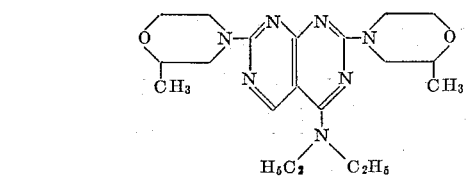

Analysis (C₂₀H₃₁N₇O₂): Molecular weight 409.52. Calculated: C, 58.66%; H, 7.63%; N, 23.94%. Found: C, 58.79%; H, 7.81%; N, 24.10%.

(h) *2,7 - bis - (2 - methylmorpholino) - 4 - di - n-propylamino - pyrimido - [4,5-d] - pyrimidine* from 2,7-bis - (2 - methylmorpholino) - 4 - chloro - pyrimido-[4,5-d]-pyrimidine and dipropylamine. The reaction product had a melting point of 167–169° C.

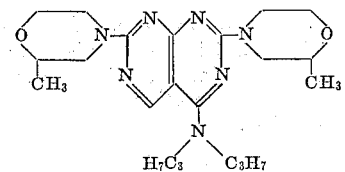

Analysis (C₂₂H₃₅N₇O₂): Molecular weight 429.58. Calculated: C, 61.61%; H, 8.21%; N, 22.83%. Found: C, 61.70%; H, 8.39%; N, 22.91%.

(i) *2,7 - bis - (2 - methylmorpholino) - 4 - di - n-butylamino - pyrimido - [4,5-d] - pyrimidine* from 2,7-bis - (2 - methylmorpholino) - 4 - chloro - pyrimido-[4,5-d]-pyrimidine and dibutylamine. The reaction product had a melting point of 127–129° C.

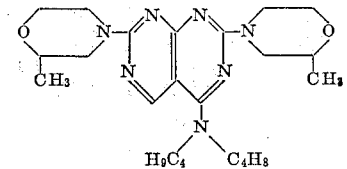

Analysis: (C₂₄H₃₉N₇O₂): molecular weight 457.63. Calculated: C, 62.99% H, 8.59%; N, 21.43%. Found: C, 63.07%; H, 8.68%; N, 21.25%.

EXAMPLE VIII

*Various 2,4,7-triamino-pyrimido-[4,5-d]-pyrimidines*

(a) *2,7 - bis - (N' - methyl - piperazino) - 4 - morpholino -pyrimido - [4,5-d] - pyrimidine.*—3.1 gm. (0.008 mol) of 2,7 - bis - (N' - methyl - piperazino) - 4 - chloro-pyrimido-[4,5-d]-pyrimidine, obtained by chlorinating the end product of Example 1(d), were admixed with 20 cc. (0.23 mol) of morpholine, and the mixture was refluxed for two hours. Thereafter, the reaction mixture was evaporated to dryness in vacuo. The crystalline residue was admixed with 10 cc. of 2 N sodium hydroxide, and the resulting mixture was extracted with chloroform. The chloroform extract solution was evaporated in vacuo, and the residue was recrystallized from absolute ethyl acetate. The yield was 1.8 gm. (51% of theory) of the compound of the formula

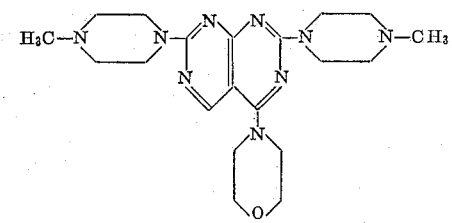

having a melting point of 208–210° C.

Analysis: (C₂₀H₃₁N₉O) molecular weight 413.54. Calculated: C, 58.09%; H, 7.56%; N, 30.49%. Found: C, 58.30%; H, 7.61%; N, 30.33%.

Using an analogous procedure, but varying the reaction periods and the reaction temperatures as required, the following additional 2,4,7 - triamino - pyrimido-[4,5-d]-pyrimidines were prepared:

(b) 2,7 - bis - (N' - methyl - piperazino) - 4 - benzylamino - pyrimido - [4,5-d] - pyrimidine from 2,7-bis - (N' - methyl - piperazino) - 4 - chloro - pyrimido-[4,5-d]-pyrimidine and benzylamine. The product had a melting point of 225–227° C.

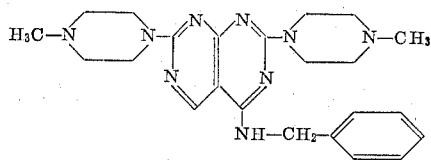

Analysis: ($C_{23}H_{31}N_9$) molecular weight 433.57. Calculated: C, 63.71%; H, 7.21%; N, 29.08%. Found: C, 63.58%; H, 7.39%; N, 29.24%.

(c) 2,7 - bis - (N' - methyl - piperazino) - 4 - n-propylamino - pyrimido - [4,5-d] - pyrimidine from 2,7-bis - (N' - methyl - piperazino) - 4 - chloro - pyrimido-[4,5-d] - pyrimidine and propylamine. The reaction product had a melting point of 267–269° C.

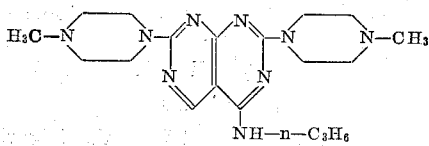

Analysis: ($C_{19}H_{31}N_9$) molecular weight 385.53. Calculated: C, 59.20%; H, 8.11%; N, 32.71%. Found: C, 59.13%; H, 8.01%; N, 32.84%.

(d) 2,7 - bis - (N' - methyl - piperazino) - 4 - isobutylamino - pyrimido - [4,5 - d] - pyrimidine from 2,7-bis-(N'-methylpiperazino) - 4 - chloro - pyrimido - [4,5 - d]-pyrimidine and isobutylamine. The reaction product had a melting point of 268–270° C.

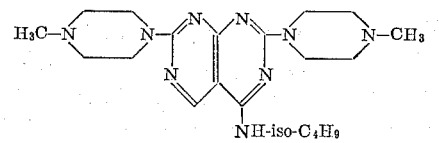

Analysis ($C_{20}H_{33}N_9$): Molecular weight 399.56. Calculated: C, 60.11%; H, 8.33%; N, 31.55%. Found: C, 60.28%; H, 8.49%; N, 31.47%.

(e) 2,7 - bis - (N' - methyl - piperazino) - 4 - pyrrolidino - pyrimido - [4,5 - d] - pyrimidine from 2,7-bis-(N'-methyl - piperazino) - 4 - chloro - pyrimido - [4,5 - d]-pyrimidine and pyrrolidine. The reaction product had a melting point of 210–212° C.

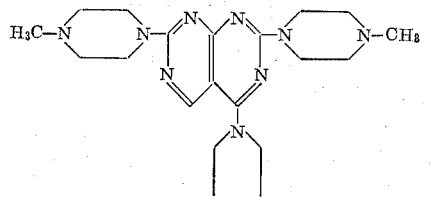

Analysis ($C_{20}H_{31}N_9$): Molecular weight 397.54. Calculated: C, 60.42%; H, 7.86%; N, 31.72%. Found: C, 60.40%; H, 8.05%; N, 31.65%.

(f) 2,4,7 - tris - (N' - methyl - piperazino) - pyrimido-[4,5 - d] - pyrimidine from 2,7-bis-(N'-methyl-piperazino) - 4 - chloro - pyrimido - [4,5 - d] - pyrimidine and N-methyl-piperazine. The reaction product had a melting point of 167–168° C.

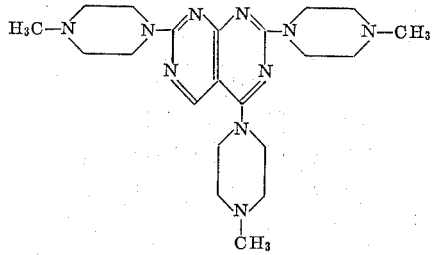

Analysis ($C_{21}H_{34}N_{10}$): Molecular weight 426.58. Calculated: C, 59.12%; H, 8.04%; N, 32.84%. Found: C, 58.93%; H, 8.03%; N, 33.10%.

(g) 2,7 - bis - (N' - methyl - piperazino) - 4 - n - butylamino - pyrimido - [4,5 - d] - pyrimidine from 2,7-bis-(N' - methyl - piperazino) - 4 - chloro - pyrimido - [4,5-d]-pyrimidine and n-butylamine. The reaction product had a melting point of 257–259° C.

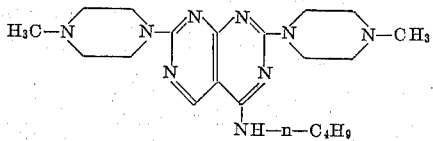

Analysis ($C_{20}H_{33}N_9$): Molecular weight 399.56. Calculated: C, 60.11%; H, 8.33%; N, 31.56%. Found: C, 60.23%; H, 8.41%; N, 31.48%.

(h) 2,7 - bis - (N' - methyl - piperazino) - 4 - dimethylamino - pyrimido - [4,5 - d] - pyrimidine from 2,7-bis-(N' - methyl - piperazino) - 4 - chloro - pyrimido - [4,5-d]-pyrimidine and dimethylamine. The reaction product had a melting point of 98–100° C.

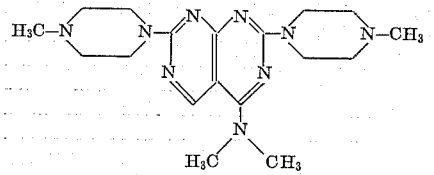

Analysis ($C_{18}H_{29}N_9$): Molecular weight 371.50. Calculated: C, 58.19%; H, 7.87%; N, 33.94%. Found: C, 57.98%; H, 8.03%; N, 33.76%.

(i) 2,7 - bis - (N' - methyl - piperazino) - 4 - diethylamino - pyrimido - [4,5 - d] - pyrimidine from 2,7-bis-(N' - methyl - piperazino) - 4 - chloro - pyrimido - [4,5-d]-pyrimidine and diethylamine. The reaction product had a melting point of 134–136° C.

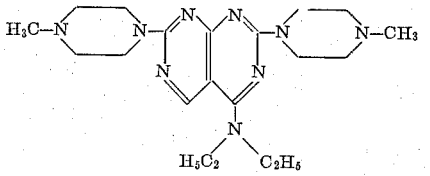

Analysis ($C_{20}H_{33}N_9$): Molecular weight 399.56. Calculated: C, 60.12%; H, 8.33%; N, 31.56%. Found: C, 59.95%; H, 8.42%; N, 31.30%.

The novel compounds embraced by Formula I above and their non-toxic, pharmacologically acceptable acid addition salts have useful pharmacodynamic properties. More particularly, they exhibit coronary dilating and sedative activities.

The toxicity of the compounds according to the present invention was determined by customary methods and was found to be very low.

The effective single dose of the compounds for pharmacological purposes ranges from 50 to 200 mgm., and the average daily dose is 150–600 mgm.

For therapeutic application the compounds according to the present application are administered in the form of dosage unit compositions containing the desired amount of active ingredient in admixing with various inert carrier and compounding assistants.

The following examples are illustrative examples of suitable dosage unit compositions adapted for this purpose.

The parts are parts by weight unless otherwise specified.

EXAMPLE IX

Injectable solution in ampules

The contents of the ampules are compounded from the following ingredients:

| | Parts |
|---|---|
| 2,7 - dimorpholino - 4n - diethylamino - pyrimido-[4,5-d]-pyrimidine | 25.0 |
| Tartaric acid | 10.0 |
| Polyethylene glycol 600 | 100.0 |
| Double-distilled water, q.s. ad. | |

Compounding procedure

The pyrimido-pyrimidine compound and the tartaric acid are dissolved in a mixture consisting of the polyethylene glycol and an equal volume of distilled water which had been warmed to 70° C., and then the solution is cooled to room temperature. Thereafter, more distilled water is added to make the concentration of the active ingredient in the solution 25 mgm./ml. The solution is filtered to remove suspended particles. The finished injectable solution is then filled into brown 1 ml. ampules, which are sterilized for twenty minutes at 120° C.

EXAMPLE X

Drops

The drop solution is compounded from the following ingredients:

| | Parts |
|---|---|
| 2,7 - dimorpholino - 4 - isoamylamino - pyrimido-[4,5-d]-pyrimidine | 25.0 |
| Tartaric acid | 30.0 |
| Polyethylene glycol 600 | 200.0 |
| Cane sugar | 200.0 |
| Sorbic acid | 1.0 |
| Flavoring (bitter essence No. 25973, Haarmann & Reimer | 40.0 |
| Ethanol (by volume) | 0.2 |
| Distilled water, q.s. ad. | |

Compounding procedure

The sorbic acid is dissolved in the ethanol and the same volume of distilled water is added. The pyrimido-pyrimidine compound and the tartaric acid are dissolved therein, accompanied by stirring (solution I). The cane sugar is dissolved in distilled water (solution II). The amount of water in solutions I and II is such that the final drop solution has a concentration of active ingredient of 25 mgm./ml. Solution I, the polyethylene glycol and the flavoring are stirred into solution II, and the resulting solution is filtered through a suitable filter.

EXAMPLE XI

Tablets

The tablets are compounded from the following ingredients:

| | Parts |
|---|---|
| 2,7 - dimorpholino - 4 - ethoxy - pyrimido-[4,5-d]-pyrimidine | 80.0 |
| Lactose, powdered | 70.0 |
| Potato starch, dry | 50.0 |
| Glycerin | 2.0 |
| Polyvinyl pyrrolidone | 8.0 |
| Talcum | 8.0 |
| Magnesium stearate | 2.0 |
| | 220.0 |

Compounding procedure

The pyrimido-pyrimidine compound is admixed with the lactose, the potato starch and the polyvinyl pyrrolidone, and the resulting mixture is granulated with a 5% solution of the glycerin in distilled water. The granulate is passed through a 1 mm.-mesh screen and is then dried at 40° C. The dry granulate is admixed with the remaining ingredients and the final mixture is pressed into tablets, weighing 220 mgm. each, with the aid of a tablet-making machine. Each tablet contains 80 mgm. of the active ingredient.

EXAMPLE XII

Gelatin capsules

The contents of the capsules are compounded from the following ingredients:

| | Parts |
|---|---|
| 2,7 - dipiperidino - 4 - pyrrolidino-pyrimido-[4,5-d]-pyrimidine | 50.0 |
| Lactose | 60.0 |
| Talcum | 10.0 |
| | 120.0 |

Compounding procedure

All of the above ingredients are admixed with each other and thoroughly blended. The resulting mixture is filled into No. 3 gelatin capsules, each capsule containing 120 mgm. of the mixture. The active ingredient content of each capsule is 50 mgm.

EXAMPLE XIII

Coated pills

The pill core is compounded from the following ingredients:

| | Parts |
|---|---|
| 2,7 - dimorpholino - 4 - propoxy - pyrimido-[4,5-d]-pyrimidine | 70.0 |
| Potato starch, dry | 35.0 |
| Glycerin | 2.5 |
| Polyvinyl pyrrolidone | 5.0 |
| Talcum | 6.5 |
| Magnesium stearate | 1.0 |
| | 120.0 |

Compounding procedure

The pyrimido-pyrimidine compound is admixed and thoroughly blended with the potato starch and the polyvinyl pyrrolidone, and the resulting mixture is granulated with a 10% solution of the glycerin in distilled water. The granulate is passed through a 1 mm.-mesh screen and is then dried at 40° C. The dry granulate is admixed with the remaining ingredients, and the resulting mixture is pressed into pill cores weighing 120 mgm. each. The pill cores are then coated with a mixture consisting essentially of talcum and sugar in the customary manner. The coated pills are finally polished with beeswax in a rotary drum polisher. Each pill weighs approximately 200 mgm. and contains 70 mgm. of the active ingredient.

EXAMPLE XIV

Suppositories

The suppositories are compounded from the following ingredients:

| | Parts |
|---|---|
| 2,7 - dimorpholino - 4 - [(3 - methoxypropyl)-amino]-pyrimido-[4,5-d]-pyrimidine | 150.0 |
| Suppository base (cocoa butter) | 1600.0 |
| | 1750.0 |

Compounding procedure

The suppository base is melted and then, at a temperature of 35° C., the pyrimido-pyrimidine compound, in powdered form, is stirred uniformly into the suppository base. The resulting mixture is then poured at 33° C. into suppository molds holding 1750 mgm. of the mixture. Each suppository contains 150 mgm. of the active ingredient.

While we have illustrated our invention with the aid of certain specific embodiments, it will be readily apparent to those skilled in the art that our invention is not limited to those embodiments. This is particularly true of the examples relating to the dosage unit compositions; quite obviously, any of the other pyrimido-pyrimidine compounds embraced by Formula I or their non-toxic acid addition salts may be substituted for the particular active ingredients recited in these examples. Similarly, many other changes and modifications may be made without departing from the spirit of the invention or the scope of the appended claims.

We claim:
1. A compound selected from the group consisting of basic tri-substituted pyrimido-[4,5-d]-pyrimidines of the formula

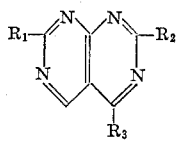

wherein
$R_1$ and $R_2$ are each selected from the group consisting of pyrrolidino, piperidino, morpholino, lower alkyl-morpholino and N'-lower alkyl-piperazino, and
$R_3$ is selected from the group consisting of pyrrolidino, piperidino, morpholino, lower alkyl-morpholino, N'-lower alkyl-piperazino, mono-alkyl-amino of 1 to 10 carbon atoms, di-lower alkyl-amino, cycloalkylamino, (phenyl-lower alkyl)-amino, (lower alkyl)-(phenyl-lower alkyl)-amino, (lower alkoxy-lower alkyl)-amino, (di-lower alkyl-amino-lower alkyl)-amino, hydrazino, mono-lower alkenyl-amino, di-lower alkenyl-amino, alkoxy of 1 to 10 carbon atoms, lower alkenyloxy, lower alkoxy-lower alkoxy, (lower alkyl-amino)-lower alkoxy and cycloalkyloxy, and their non-toxic, pharmacologically acceptable acid addition salts.

2. 2,4,7-trimorpholino-pyrimido-[4,5-d]-pyrimidine.
3. 2,7 - dimorpholino - 4-benzylethylamino pyrimido-[4,5-d]-pyrimidine.
4. 2,7 - dimorpholino - 4-diethylamino-pyrimido-[4,5-d]-pyrimidine.
5. 2,7 - bis - (2-methylmorpholino)-4-methoxy-pyrimido-[4,5-d]-pyrimidine.
6. 2,7 - dimorpholino - 4 - ethoxy-pyrimido-[4,5-d]-pyrimidine.
7. 2,7 - bis - (2-methylmorpholino)-4-ethoxy-pyrimido-[4,5-d]-pyrimidine.
8. 2,7 - dipyrrolidino - 4 - (1-propoxy)-pyrimidio-[4,5-d]-pyrimidine.
9. 2,7 - dimorpholino - 4 - (2-propoxy)-pyrimido-[4,5-d]-pyrimidine.
10. 2,7 - bis - (2 - methylmorpholino)-4-(2-propoxy)-pyrimido-[4,5-d]-pyrimidine.
11. 2,7 - bis - (2 - methylmorpholino)-4-(3-methyl-1-propoxy)-pyrimido-[4,5-d]-pyrimidine.

References Cited by the Examiner
UNITED STATES PATENTS

| | | | |
|---|---|---|---|
| 2,601,204 | 6/1952 | Campbell et al. | 167—65 |
| 2,890,984 | 6/1959 | Shayun | 167—65 |
| 2,940,972 | 6/1960 | Roch | 260—247.5 |
| 2,949,466 | 8/1960 | Hoefle et al. | 260—256.4 |
| 3,055,900 | 9/1962 | Druey et al. | 260—247.1 |

WALTER A. MODANCE, *Primary Examiner.*
NICHOLAS S. RIZZO, *Examiner.*